United States Patent
Li et al.

(10) Patent No.: US 12,531,774 B2
(45) Date of Patent: Jan. 20, 2026

(54) FAULT DETECTION METHOD, NETWORK DEVICE, AND SYSTEM

(71) Applicant: HUAWEI TECHNOLOGIES CO., LTD., Guangdong (CN)

(72) Inventors: Zhiyong Li, Beijing (CN); Yaqun Xiao, Beijing (CN); Jianwu Hao, Beijing (CN); Sheng Fang, Beijing (CN); Li Fan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/226,967

(22) Filed: Jul. 27, 2023

(65) Prior Publication Data

US 2023/0388177 A1 Nov. 30, 2023

Related U.S. Application Data

(63) Continuation of application No. PCT/CN2021/141435, filed on Dec. 27, 2021.

(30) Foreign Application Priority Data

Jan. 29, 2021 (CN) .......................... 202110128378.X

(51) Int. Cl.
*H04L 12/00* (2006.01)
*H04L 41/0631* (2022.01)
(Continued)

(52) U.S. Cl.
CPC ...... *H04L 41/0631* (2013.01); *H04L 43/0823* (2013.01); *H04L 45/34* (2013.01)

(58) Field of Classification Search
CPC . H04L 41/0631; H04L 13/0823; H04L 45/34; H04L 45/026; H04L 45/247;
(Continued)

(56) References Cited

U.S. PATENT DOCUMENTS

2006/0221843 A1* 10/2006 Cidon ............... H04L 43/50
370/242
2013/0028099 A1* 1/2013 Birajdar ............ H04L 45/28
370/242
2019/0238448 A1 8/2019 Pignataro et al.

FOREIGN PATENT DOCUMENTS

CN 102594600 A * 7/2012 ............ H04L 45/28
CN 102624609 A 8/2012
(Continued)

OTHER PUBLICATIONS

Wang C, CN 106789310 A, Bidirectional Forward Detection Based Method For Detecting Fault In Source And Destination Devices Of System, Involves Stopping Bidirectional Forward Detection Control Message Transmitting Process Between Two Devices Under Query Mode, 3 pages, 2016 (Year: 2016).*

(Continued)

*Primary Examiner* — Frantz Coby
(74) *Attorney, Agent, or Firm* — WOMBLE BOND DICKINSON (US) LLP

(57) ABSTRACT

A fault detection method, a network device, and a system are provided. The method includes: After a first network device receives, through a first forwarding path in an SR policy, a BFD packet that is sent by a second network device and that includes indication information of a SID list, the first network device determines, based on the indication information of the SID list, a second forwarding path that is reversely co-routed with the first forwarding path, and sends a response packet of the BFD packet to the second network device through the second forwarding path, so that the second network device can perform fault detection on the first forwarding path based on the response packet.

28 Claims, 10 Drawing Sheets

(51) Int. Cl.
*H04L 43/0823* (2022.01)
*H04L 45/00* (2022.01)

(58) Field of Classification Search
CPC ..... H04L 45/28; H04L 45/50; H04L 41/0895; H04L 43/20; H04L 41/0894; H04L 41/06
USPC .................................................. 370/242, 244
See application file for complete search history.

(56) References Cited

FOREIGN PATENT DOCUMENTS

| | | | |
|---|---|---|---|
| CN | 107005481 A | | 8/2017 |
| CN | 108768788 A | | 11/2018 |
| CN | 110855531 A | | 2/2020 |
| CN | 111917643 A | | 11/2020 |
| CN | 113132223 A | | 7/2021 |
| CN | 113381933 A | | 9/2021 |
| EP | 0373277 A | * | 6/1990 ............. H04L 27/34 |

OTHER PUBLICATIONS

C. Pignataro et al, Seamless Bidirectional Forwarding Detection (S-BFD), RFC 7880, Internet Engineering Task Force (IETF), Jul. 2016, total 24 pages.

C. Pignataro, Seamless Bidirectional Forwarding Detection (S-BFD) for IPV4, IPV6, and MPLS, RFC 7881, Internet Engineering Task Force (IETF), Jul. 2016, total 8 pages.

S. Previdi et al., 2020, Distribution of Traffic Engineering (TE) Policies and State using BGP-LS draft-ietf-idr-te-lsp-distribution-14, IETF, Oct. 23, 2020, total 40 pages.

C. Filsfils, Segment Routing Policy Architecture draft-ietf-spring-segment-routing-policy-09, IETF, Nov. 1, 2020, total 31 pages.

S. Previdi et al, Advertising Segment Routing Policies in BGP, draft-ietf-idr-segment-routing-te-policy-11, Nov. 13, 2020, total 39 pages.

\* cited by examiner

Format of a sub-TLV field carrying indication information of a first SID list in a message 51, 52, or 53:

| Type Type | Length Length | Reserved Reserved |
|---|---|---|
| Value Value (the indication information of the first SID list) | | |

Format of a sub-TLV field carrying indication information of a first SID list in a message 51, 52, or 53:

| Type Type | Length Length | Flags Flags | Reserved Reserved |
|---|---|---|---|
| Value Value (the indication information of the first SID list and indication information of a second SID list) | | | |

FIG. 4b

Format of a value field in a sub-TLV field:

| Label Label | Traffic level Exp (also referred to as TC) | Flags S | Time to live TTL |
|---|---|---|---|

FIG. 4c

Format of a SID list TLV field in a message 61:

| Type Type | Length Length |
|---|---|
| Flags Flags | Reserved Reserved |
| Message type identifier MT ID | Algorithm Algorithm | Reserved Reserved |
| Weight Weight | |
| At least one sub-TLV (having an variable length) | |

FIG. 5a

Format of a sub-TLV field carrying indication
information of a first SID list in a message 61:

| Type Type | Length Length |
|---|---|
| Value Value (the indication information of the first SID list) ||

FIG. 5b

Format of a sub-TLV field carrying indication
information of a first SID list in a message 61:

| Type Type | Length Length |
|---|---|
| Flags Flags | |
| Value Value (the indication information of the first SID list and indication information of a second SID list) ||

FIG. 5c

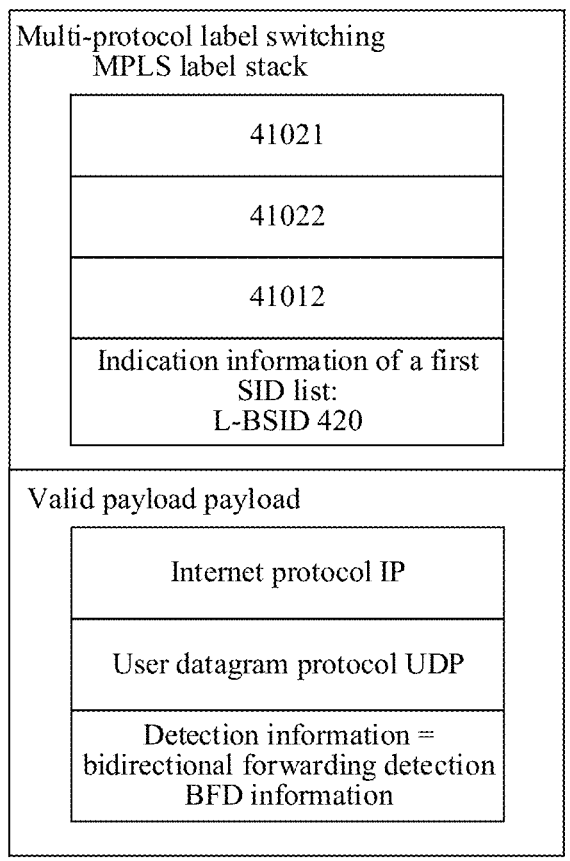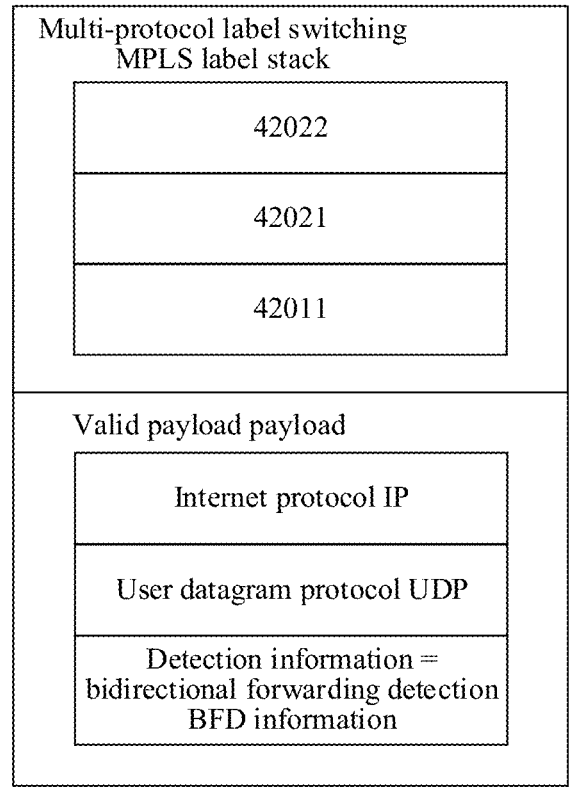
FIG. 6a

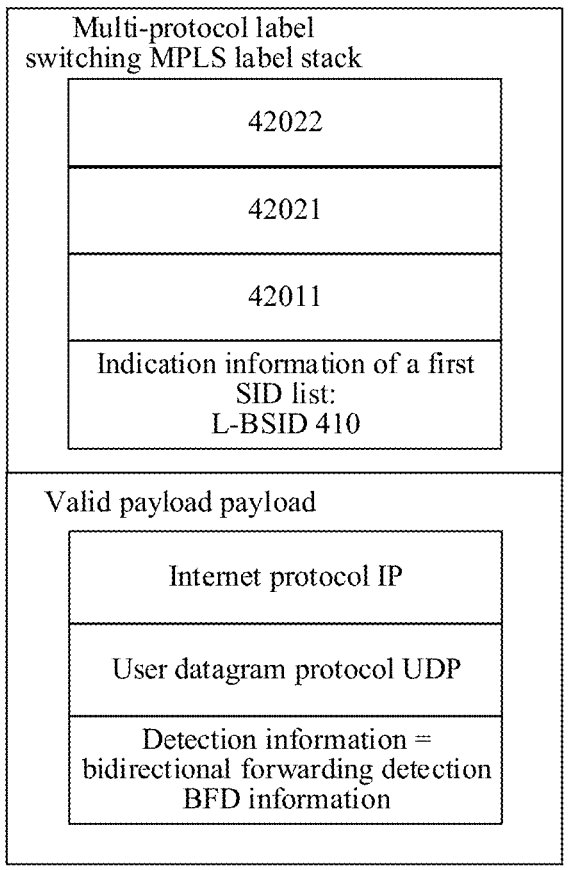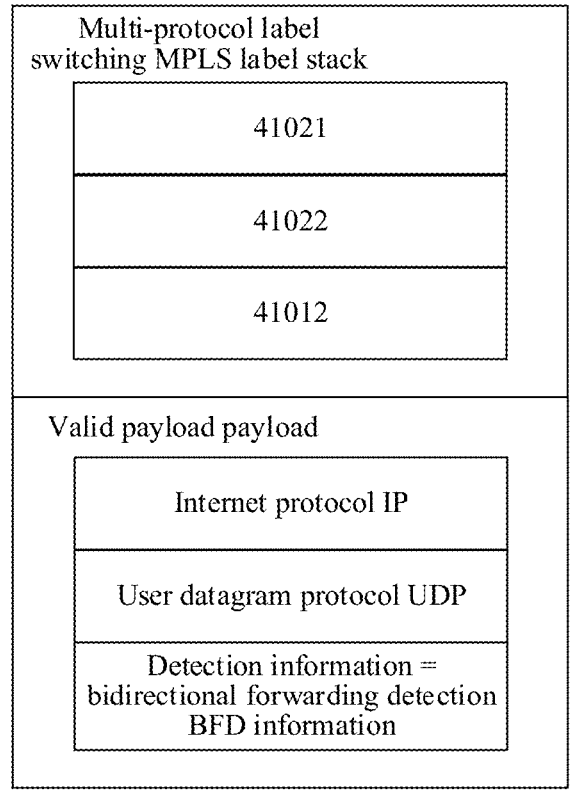
FIG. 6b

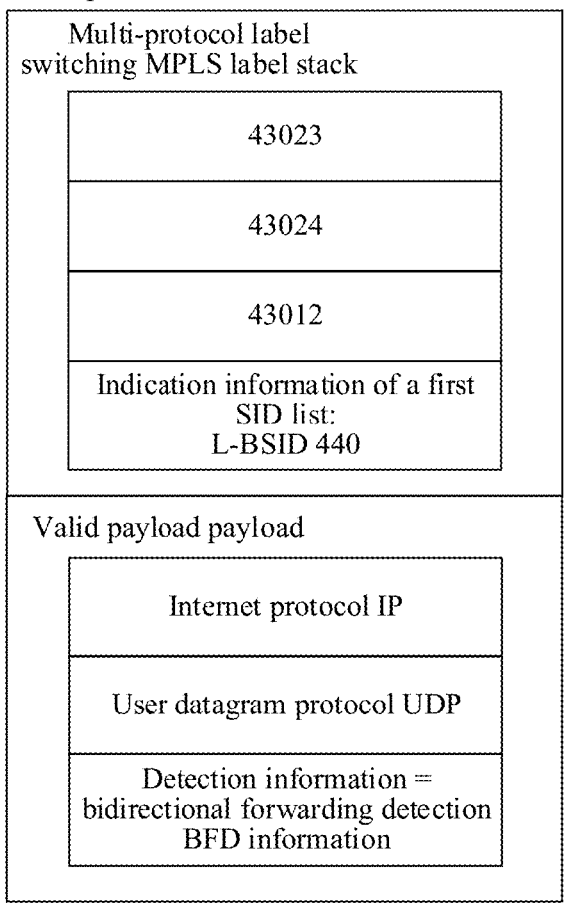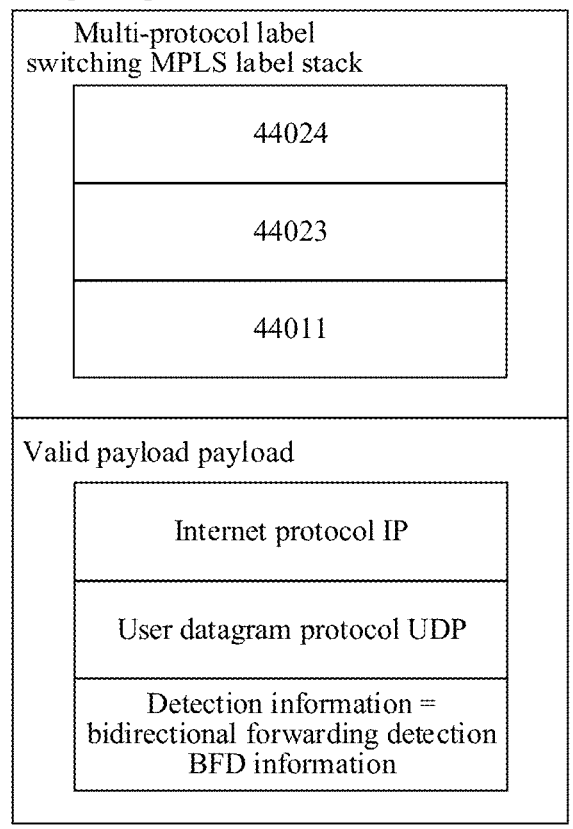
FIG. 6c
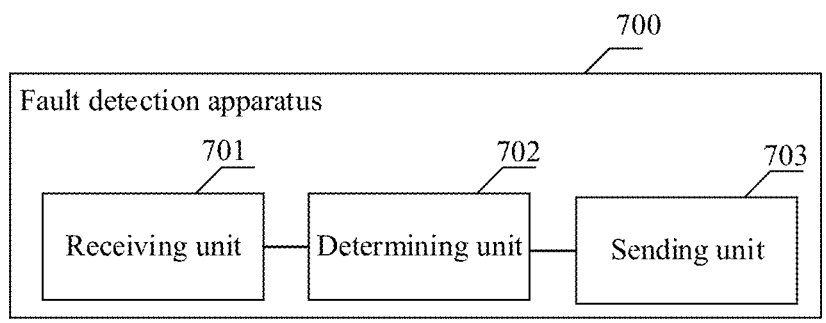
FIG. 7

FAULT DETECTION METHOD, NETWORK DEVICE, AND SYSTEM

CROSS-REFERENCE TO RELATED APPLICATIONS

This application is a continuation of International Application No. PCT/CN2021/141435, filed on Dec. 27, 2021, which claims priority to Chinese Patent Application No. 202110128378. X, filed on Jan. 29, 2021. The disclosures of the aforementioned applications are hereby incorporated by reference in their entireties.

TECHNICAL FIELD

This application relates to the field of communication technologies, and in particular, to a fault detection method, a network device, and a system.

BACKGROUND

Bidirectional forwarding detection (BFD), as a mechanism that can quickly perform end-to-end detection, is widely used for fault detection of a segment routing policy (SR policy).

Currently, a process in which a BFD mechanism performs fault detection includes: A transmitting end sends a BFD packet to a reflector through an SR policy, and needs the reflector to feed back a response packet of the BFD packet to the transmitting end, to determine whether a fault exists on the SR policy. Because the SR policy is a unidirectional tunnel, the response packet of the BFD packet is usually transmitted in an internet protocol (IP) routing manner. However, a transmission path (which may also be referred to as an IP path) of the response packet that is determined in the IP routing manner may not pass through a network device through which the SR policy passes, that is, transmission of the BFD packet and transmission of the response packet of the BFD packet are not co-routed. In this case, when a fault occurs on a device on the IP path, the response packet cannot reach the transmitting end, and the transmitting end incorrectly determines, based on this, that a fault occurs on the SR policy, reducing accuracy of a detection result for the SR policy.

In view of this, a fault detection method needs to be urgently provided. A feature that the BFD mechanism can quickly complete detection is used, and a problem that a BFD detection result is not accurate enough because transmission of the BFD packet and transmission of the response packet are not co-routed can also be overcome, to implement more accurate fault detection on the SR policy by the BFD mechanism.

SUMMARY

In view of this, this application provides a fault detection method, a network device, and a system. Indication information of a segment identifier list (SID list) is carried in a BFD packet, so that a receiving end can determine, based on the indication information of the SID list in the BFD packet, a forwarding path that is reversely co-routed with a forwarding path through which the BFD packet is transmitted, and send a response packet of the BFD packet to a transmitting end through the determined forwarding path, to implement fault detection on a forwarding path in an SR policy. In this way, precision and accuracy of fault detection by a BFD mechanism are improved.

In this application, BFD detection may be, for example, static BFD detection, dynamic BFD detection, or seamless bidirectional forwarding detection (SBFD).

According to a first aspect, this application provides a fault detection method, and the method is used in a first network device. When a first SR policy exists between a second network device and the first network device, and the second network device needs to perform fault detection on a first forwarding path in the first SR policy, for example, the method may include: The first network device receives, through the first forwarding path in the first SR policy, a first BFD packet that is sent by the second network device and that includes indication information of a first SID list. In this case, the first network device may determine, based on the indication information of the first SID list in the first BFD packet, a second forwarding path that is reversely co-routed with the first forwarding path, and send a first response packet of the first BFD packet to the second network device through the second forwarding path, where the first response packet indicates the second network device to perform fault detection on the first forwarding path. In this way, according to the method, a transmitting end (that is, the second network device) of BFD detection includes indication information of a SID list in a BFD packet, so that a receiving end (that is, the first network device) can determine, based on the indication information of the SID list, a forwarding path that is reversely co-routed with a forwarding path through which the BFD packet is transmitted, and send a response packet of the BFD packet to the transmitting end through the determined forwarding path. That a real forwarding path of the BFD packet is reversely co-routed with a real forwarding path of the response packet is ensured, to implement accurate fault detection on a forwarding path on the SR policy, so that precision and accuracy of fault detection on the SR policy by a BFD mechanism are improved.

The SR policy may be an SR-MPLS policy, corresponding to a multi-protocol label switching (MPLS) network scenario; or the SR policy may be an SRv6 policy, corresponding to an internet protocol version 6 (IPv6). In an SR-MPLS policy scenario, the SID list corresponds to an MPLS label stack. The SID list may include an MPLS label corresponding to at least one network device or link. In an SRv6 policy scenario, the SID list corresponds to an IPv6 address list. The SID list may include an IPv6 address corresponding to at least one network device or link.

Any two reversely co-routed SR policies may mean that sequences of network devices and links through which two tunnels pass in sequence and that are determined based on the two SR policies are opposite. That two forwarding paths in any two SR policies are reversely co-routed may mean that sequences of network devices and links through which the two forwarding paths pass in sequence and that are determined based on two SID lists corresponding to the two forwarding paths are opposite. According to an embodiment, the two reversely co-routed forwarding paths may belong to two SR policies respectively. However, it may be understood that, in an embodiment, for example, when a round-trip path between two endpoints is defined as belonging to a complete SR policy, it may alternatively be considered that the two forwarding paths belong to a same SR policy.

In an embodiment, before that the first network device receives, through the first forwarding path in the first SR policy, a first BFD packet that is sent by the second network device, the method may further include: The first network device generates the indication information of the first SID list. Alternatively, the first network device receives the indication information of the first SID list that is sent by the second network device. In this way, the first network device may store a correspondence between the indication information of the first SID list and the second forwarding path, to prepare for determining the second forwarding path based on the indication information of the first SID list in the first BFD packet after the first BFD packet is received.

In an embodiment, the method may further include: The first network device receives a message sent by a control management device, where the message includes the indication information of the first SID list. In addition, the message further includes indication information of a second SID list, where the indication information of the second SID list indicates the first forwarding path, and the indication information of the first SID list indicates the second forwarding path; or the indication information of the second SID list indicates the second forwarding path, and the indication information of the first SID list indicates the first forwarding path.

In an example, the message may be a border gateway protocol segment routing policy (BGP SR policy) packet, and the BGP SR policy packet may carry the indication information of the first SID list by using a sub type length value (sub-TLV) field. If the BGP SR policy packet further carries the indication information of the second SID list, the indication information of the first SID list and the indication information of the second SID list may be carried in one sub-TLV field in the BGP SR policy packet, or the indication information of the first SID list and the indication information of the second SID list may be respectively carried in two different sub-TLV fields in the BGP SR policy packet. It should be noted that, in addition to the BGP SR policy packet, a message for carrying the indication information of the first SID list may alternatively be a network configuration protocol (NETCONF) packet, a path computation element communication protocol (PCEP) packet, or the like.

In an embodiment, the indication information of the first SID list may alternatively be allocated by the second network device and sent to the control management device, and then sent by the control management device to the first network device. In an example, the second network device sends the indication information of the first SID list to the control management device. For example, the indication information of the first SID list may be carried in a border gateway protocol link state (BGP-LS) packet, and the indication information of the first SID list is carried in a sub-TLV field in the BGP-LS packet. If the BGP-LS packet further carries the indication information of the second SID list, the indication information of the first SID list and the indication information of the second SID list may be carried in one sub-TLV field in the BGP-LS packet, or the indication information of the first SID list and the indication information of the second SID list may be respectively carried in two different sub-TLV fields in the BGP-LS packet. It should be noted that, when the second network device sends the indication information of the first SID list to the control management device, in addition to the BGP-LS packet, a message for carrying the indication information of the first SID list may alternatively be a NETCONF packet, a PCEP packet, or the like.

In an embodiment, the indication information of the first SID list may indicate a SID list corresponding to the second forwarding path. In this case, after receiving the first BFD packet, the first network device may directly determine, based on the indication information of the first SID list, the second forwarding path through which the first response packet corresponding to the first BFD packet is transmitted, so that implementation of accurate BFD detection is possible.

In an embodiment, the indication information of the first SID list may alternatively indicate a SID list corresponding to the first forwarding path. In one case, the first network device may store the correspondence between the indication information of the first SID list and the second forwarding path. In this case, after receiving the first BFD packet, the first network device may directly determine, based on the indication information of the first SID list, the second forwarding path corresponding to the indication information of the first SID list. In another case, the first network device may alternatively store a correspondence between the indication information of the first SID list and the indication information of the second SID list. The indication information of the second SID list indicates the SID list corresponding to the second forwarding path. In this case, that the first network device determines the second forwarding path based on the indication information of the first SID list may include, for example: The first network device determines the indication information of the second SID list based on the indication information of the first SID list. Then, the first network device determines the second forwarding path based on the indication information of the second SID list. In this way, implementation of accurate BFD detection is possible.

It should be noted that, in some possible cases, if a fault exists on a network device or a link through which the second forwarding path passes, alternatively, if a fault exists on a network device or a link through which the first forwarding path passes, the second network device may not be capable of receiving the first response packet. In this case, the second network device receives no first response packet through the second forwarding path within a preset time (for example, 1 second). Because the first forwarding path and the second forwarding path are reversely co-routed, it may still be determined that a fault occurs on the first forwarding path. In some other possible cases, if the network device and the link through which the first forwarding path and the second forwarding path pass are both normal, the second network device can receive the first response packet. In this case, the second network device determines, based on the received first response packet, that the first forwarding path and the second forwarding path through which the first BFD packet and the first response packet are transmitted are both normal, that is, may determine that no fault exists on the first forwarding path.

In an embodiment, the method may further include: The first network device sends a second BFD packet to the second network device through the second forwarding path in a second SR policy. The second BFD packet includes indication information of a third SID list, and the indication information of the third SID list indicates the first network device to determine the first forwarding path through which the second response packet of the second BFD packet is sent. The first network device receives the second response packet from the first forwarding path. The first network device performs fault detection on the second forwarding path based on the second response packet. In this way, according to the method, accurate bidirectional BFD detection of a forwarding path in the SR policy can be implemented.

In an embodiment, the method may further include: The first network device receives, through a third forwarding path in the first SR policy, a third BFD packet sent by the second network device. The third BFD packet includes indication information of a fourth SID list, and the third forwarding path is different from the first forwarding path. The first network device determines a fourth forwarding path based on the indication information of the fourth SID list. The fourth forwarding path and the third forwarding path are reversely co-routed. The first network device sends a third response packet of the third BFD packet to the second network device through the fourth forwarding path. The third response packet indicates the second network device to perform fault detection on the third forwarding path. In this way, according to the method, BFD detection on a forwarding path in the SR policy that includes a plurality of forwarding paths can be implemented, and detection precision of the BFD detection is improved. In an embodiment of the application, the indication information of the first SID list may be a path segment or a binding segment identifier (binding SID, BSID); or the indication information of the first SID list may be the first SID list itself. Similarly, the indication information of the second SID list may alternatively be a path segment, a BSID, or the second SID list itself According to a second aspect, this application further provides a fault detection method, and the method is applied to a second network device. When a first SR policy exists between the second network device and a first network device and the second network device needs to perform fault detection on a first forwarding path in the first SR policy, the method may include, for example: The second network device sends a BFD packet that includes indication information of a first SID list to the first network device through the first forwarding path in the first SR policy. The indication information of the first SID list indicates the first network device to determine a second forwarding path through which a response packet of the BFD packet is sent, and the second forwarding path and the first forwarding path are reversely co-routed. If the second network device receives the response packet of the BFD packet from the second forwarding path, the second network device performs fault detection on the first forwarding path based on the response packet. In this way, according to the method, a transmitting end (that is, the second network device) of BFD detection includes the indication information of a SID list in the BFD packet, so that a receiving end (that is, the first network device) can determine, based on the indication information of the SID list, a forwarding path that is reversely co-routed with a forwarding path through which the BFD packet is transmitted, and send the response packet of the BFD packet to the transmitting end through the determined forwarding path. That a real forwarding path of the BFD packet is reversely co-routed with a real forwarding path of the response packet is ensured, to implement accurate fault detection on a forwarding path in the SR policy, so that precision and accuracy of fault detection on the SR policy by a BFD mechanism are improved.

In an embodiment, before the second network device sends the BFD packet to the first network device through the first forwarding path in the first SR policy, the method may further include: The second network device receives the indication information of the first SID list that is sent by the first network device.

In an embodiment, before the second network device sends the BFD packet to the first network device through the first forwarding path in the first SR policy, the method may further include: The second network device generates the indication information of the first SID list. In an embodiment, the second network device may further send the indication information of the first SID list to the first network device, to ensure implementation of the fault detection method provided in an embodiment of the application.

In an embodiment, before the second network device sends the BFD packet to the first network device through the first forwarding path in the first SR policy, the method may further include: The second network device receives the indication information of the first SID list that is sent by a control management device. In one case, the control management device may generate the indication information of the first SID list and send the indication information to the second network device. In another case, the indication information of the first SID list may also be generated and sent by the second network device to the control management device, and then sent by the control management device to the second network device. In an example, the second network device sends the indication information of the first SID list to the control management device may include: The second network device sends a BGP-LS packet to the control management device. The BGP-LS packet carries the indication information of the first SID list by using a sub-TLV field. That the second network device receives the indication information of the first SID list that is sent by a control management device may include: The second network device receives a BGP SR policy packet sent by the control management device. The BGP SR policy packet carries the indication information of the SID list by using the sub-TLV field.

In this application, the indication information of the first SID list may be a path segment or a BSID; or the indication information of the first SID list may be the first SID list itself. Similarly, the indication information of the second SID list may alternatively be a path segment, a BSID, or the second SID list itself.

According to a third aspect, this application provides a fault detection apparatus. The apparatus is used in a first network device. The apparatus may include a receiving unit, a determining unit, and a sending unit. The receiving unit is configured to receive, through a first forwarding path in a first segment routing policy SR policy, a first bidirectional forwarding detection BFD packet sent by a second network device. The first BFD packet includes indication information of a first segment identifier list SID list. The determining unit is configured to determine a second forwarding path based on the indication information of the first SID list. The second forwarding path and the first forwarding path are reversely co-routed. A sending unit is configured to send a first response packet of the first BFD packet to the second network device through the second forwarding path. The first response packet indicates the second network device to perform fault detection on the first forwarding path.

In an embodiment, the apparatus may further include a generation unit. The generation unit is configured to: before the first BFD packet sent by the second network device through the first forwarding path in the first SR policy is received, generate the indication information of the first SID list.

In an embodiment, the receiving unit is further configured to receive the indication information of the first SID list that is sent by the second network device.

In an embodiment, the receiving unit is further configured to receive a message sent by a control management device. The message includes the indication information of the first SID list. In an example, the message further includes indication information of a second SID list. The indication information of the second SID list indicates the first forwarding path, and the indication information of the first SID list indicates the second forwarding path; or the indication information of the second SID list indicates the second forwarding path, and the indication information of the first SID list indicates the first forwarding path. For example, the foregoing message may be a BGP SR policy packet, and the BGP SR policy packet carries the indication information of the first SID list by using a sub-TLV field.

In an example, the indication information of the first SID list indicates a SID list corresponding to the second forwarding path.

In another example, the indication information of the first SID list indicates a SID list corresponding to the first forwarding path. The determining unit is configured to determine the indication information of the second SID list based on the indication information of the first SID list; and determine the second forwarding path based on the indication information of the second SID list.

In an embodiment, the sending unit is further configured to send a second BFD packet to the second network device through the second forwarding path in a second SR policy. The second BFD packet includes indication information of a third SID list, and the indication information of the third SID list indicates the first network device to determine the first forwarding path through which a second response packet of the second BFD packet is sent. The receiving unit is further configured to receive the second response packet from the first forwarding path. In this case, the apparatus further includes a detection unit, and the detection unit is configured to perform fault detection on the second forwarding path based on the second response packet.

In an embodiment, the receiving unit is further configured to receive, through a third forwarding path in the first SR policy, a third BFD packet sent by the second network device. The third BFD packet includes indication information of a fourth SID list, and the third forwarding path is different from the first forwarding path. The determining unit is further configured to determine a fourth forwarding path based on the indication information of the fourth SID list, and the fourth forwarding path and the third forwarding path are reversely co-routed. The sending unit is further configured to send a third response packet of the third BFD packet to the second network device through the fourth forwarding path. The third response packet indicates the second network device to perform fault detection on the third forwarding path.

The indication information of the first SID list may be a path segment or a BSID, or the indication information of the first SID list may be the first SID list itself. Similarly, the indication information of the second SID list may alternatively be a path segment, a BSID, or the second SID list itself.

The fault detection apparatus provided in the third aspect is configured to perform a related operation mentioned in the first aspect. For implementations and achieved effects of the apparatus, refer to related descriptions of the first aspect. Details are not described herein again.

According to a fourth aspect, this application further provides a fault detection apparatus. The apparatus is used in a second network device, and the apparatus may include a sending unit, a receiving unit, and a detection unit. The sending unit is configured to send a BFD packet to a first network device through a first forwarding path in a first SR policy. The BFD packet includes indication information of a first SID list. The indication information of the first SID list indicates the first network device to determine a second forwarding path through which a response packet of the BFD packet is sent, and the second forwarding path and the first forwarding path are reversely co-routed. The receiving unit is configured to receive the response packet of the BFD packet from the second forwarding path. The detection unit is configured to perform fault detection on the first forwarding path based on the response packet.

In an embodiment, the receiving unit is further configured to: before the BFD packet is sent to the first network device through the first forwarding path in the first SR policy, receive the indication information of the first SID list that is sent by the first network device.

In an embodiment, the receiving unit is further configured to: before the BFD packet is sent to the first network device through the first forwarding path in the first SR policy, receive the indication information of the first SID list that is sent by a control management device. In an example, the receiving unit is configured to receive a BGP SR policy packet sent by the control management device. The BGP SR policy packet carries indication information of a SID list by using a sub-TLV field. In an embodiment, the sending unit is further configured to: before the indication information of the first SID list that is sent by the control management device is received, send the indication information of the first SID list to the control management device. The sending unit is configured to send a BGP-LS packet to the control management device. The BGP-LS packet carries the indication information of the first SID list by using the sub-TLV field.

In an embodiment, the apparatus further includes a generation unit, and the generation unit is configured to generate the indication information of the first SID list. In this case, the sending unit is further configured to send the indication information of the SID list to the first network device.

The indication information of the first SID list may be a path segment or a BSID, or the indication information of the first SID list may be the first SID list itself. Similarly, indication information of a second SID list may alternatively be a path segment, a BSID, or the second SID list itself.

The fault detection apparatus provided in the fourth aspect is configured to perform a related operation mentioned in the second aspect. For implementations and achieved effects of the apparatus, refer to related descriptions of the second aspect. Details are not described herein again.

According to a fifth aspect, this application further provides a network device. The network device includes a processor, configured to enable the network device to implement the method provided in the first aspect or the second aspect. The network device may further include a memory. The memory is coupled to the processor. When the processor executes instructions stored in the memory, the network device may be enabled to implement the method provided in the first aspect or the second aspect. The network device may further include a communication interface. The communication interface is configured by the network device to communicate with another device. For example, the communication interface may be a transceiver, a circuit, a bus, a module, or a communication interface of another type. In this application, the instructions in the memory may be stored in advance, or may be stored after being downloaded from the Internet when the network device is used. A source of the instructions in the memory is not limited in this application.

According to a sixth aspect, this application further provides a network system. The network system includes a first network device and a second network device. The first network device is configured to perform the method provided in the first aspect. The second network device is configured to perform the method provided in the second aspect.

According to a seventh aspect, this application provides a chip, including a processor and an interface circuit. The interface circuit is configured to receive instructions and transmit the instructions to the processor. The processor is configured to execute the instructions corresponding to the method provided in the first aspect or the second aspect.

According to an eighth aspect, this application provides a computer-readable storage medium. The computer-readable storage medium stores program code or instructions. When the program code or the instructions are run on a computer, the computer is enabled to perform the method provided in the first aspect or the second aspect.

According to a ninth aspect, this application provides a computer program product, including a computer program. When the computer program is executed by a processor, the method provided in the first aspect or the second aspect is implemented.

BRIEF DESCRIPTION OF DRAWINGS

FIG. 4b is a schematic diagram of a format of a sub-TLV field in another BGP SR policy packet according to an embodiment of this application;

FIG. 4c is a schematic diagram of a format of a Value field in the sub-TLV field in FIG. 4a or FIG. 4b according to an embodiment of this application;

FIG. 5a is a schematic diagram of a format of a SID list TLV field in a BGP-LS packet according to an embodiment of this application;

FIG. 5b is a schematic diagram of a format of a sub-TLV field in a SID list TLV field according to an embodiment of this application;

FIG. 5c is a schematic diagram of a format of a sub-TLV field in another SID list TLV field according to an embodiment of this application;

FIG. 6a is a schematic diagram of formats of a BFD packet c and a response packet C according to an embodiment of this application;

FIG. 6b is a schematic diagram of formats of a BFD packet d and a response packet D according to an embodiment of this application;

FIG. 6c is a schematic diagram of formats of a BFD packet e and a response packet E according to an embodiment of this application;

FIG. 7 is a schematic diagram of a structure of a fault detection apparatus 700 according to an embodiment of this application;

DESCRIPTION OF EMBODIMENTS

Currently, in a process of performing BFD detection on an SR policy, a BFD packet is transmitted from a transmitting end to a receiving end through a to-be-detected SR policy. However, when the receiving end sends a response packet of the BFD packet, a path of the response packet from the receiving end to the transmitting end is determined in an IP routing manner, and the response packet is sent to the transmitting end through the path determined in the IP routing manner. The transmitting end performs fault detection on the SR policy based on the response packet.

Figure 1:
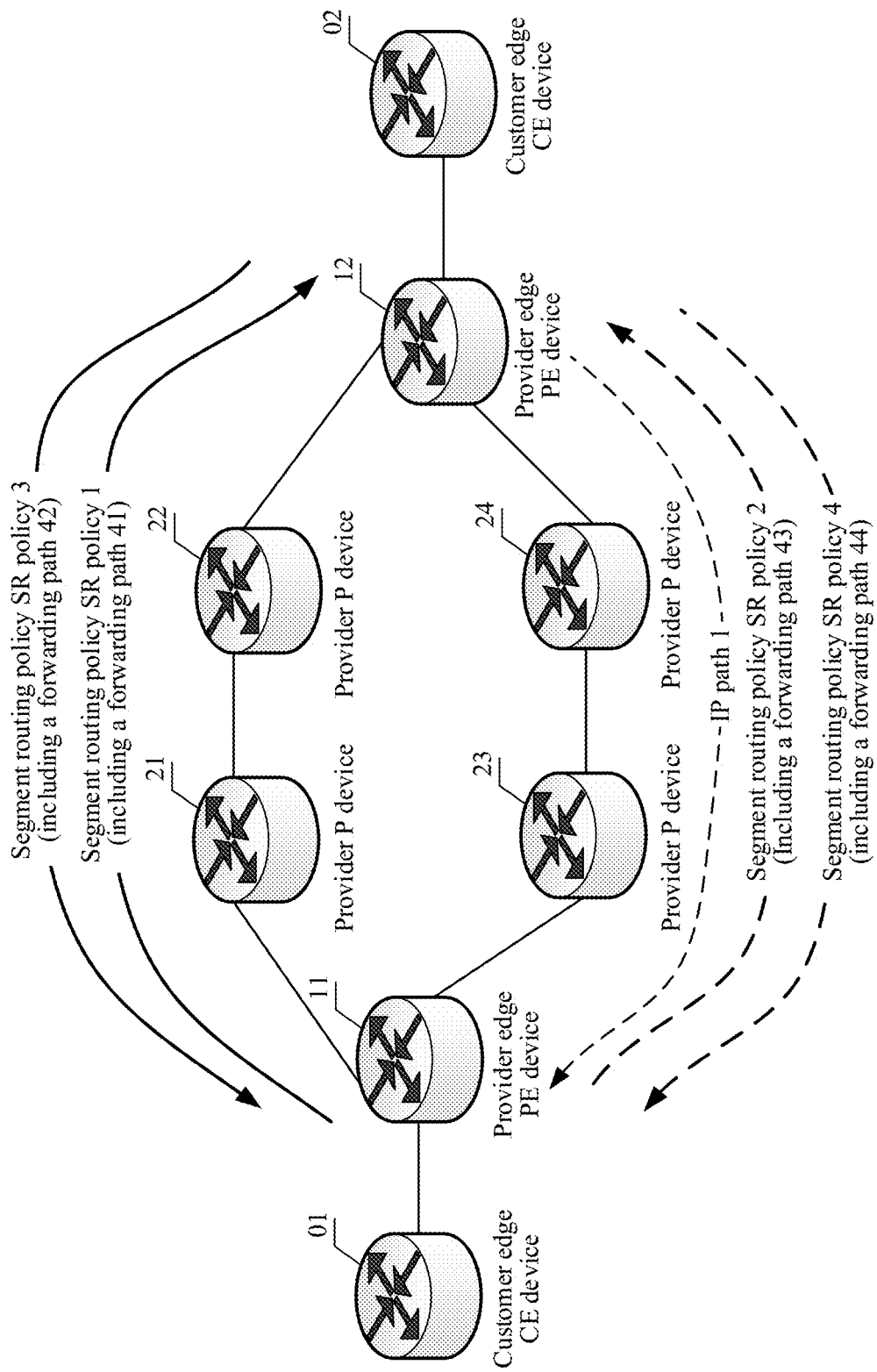
FIG. 1 is a schematic diagram of a structure of a network system according to an embodiment of this application.

For example, a network system shown in FIG. 1 may include a customer edge (CE) device 01, a CE device 02, a provider edge (PE) device 11, a PE device 12, a provider (P) device 21, a P device 22, a P device 23, and a P device 24. The PE device 11 is connected to the CE device 01, and the PE device 11 is connected to the PE device 12 through the P device 21 and the P device 22 in sequence. The PE device 11 is also connected to the PE device 12 through the P device 23 and the P device 24 in sequence, and the PE device 12 is connected to the CE device 02. It is assumed that an SR policy 1 and an SR policy 2 exist between the PE device 11 and the PE device 12. The PE device 11 is an ingress node of the SR policy 1 and the SR policy 2, and the PE device 12 is an egress node of the SR policy 1 and the SR policy 2. For ease of description, in the following two examples, that both the SR policy 1 and the SR policy 2 include one forwarding path is used as an example. Therefore, BFD detection on the forwarding path may also be referred to as BFD detection on the SR policy. The SR policy 1 includes the P device 21 and the P device 22, and the SR policy 2 includes the P device 23 and the P device 24.

In an example, when the PE device 11 needs to perform BFD detection on the SR policy 1, an operation to be performed may include: S11: The PE device 11 sends a BFD packet a to the PE device 12 through the SR policy 1. S12: The PE device 12 sends, through the P device 24 and the P device 23 in an IP routing manner, a response packet A corresponding to the BFD packet a to the PE device 11, that is, an IP path 1 through which the response packet A passes passes through the PE device 12, the P device 24, the P device 23, and the PE device 11 in sequence. If a fault occurs on a network device or a link through which the IP path 1 passes, for example, a fault occurs on the P device 23, a fault occurs on the P device 24, or a fault occurs on at least one segment of link included in the IP path 1, the PE device 11 may not be capable of receiving the response packet A within a preset time, and further incorrectly determine that a fault occurs on the SR policy 1. In addition, even if the PE device 11 receives the response packet A, in a scenario such as bidirectional detection, because transmission of the BFD packet a and transmission of the response packet A are not co-routed, the PE device 11 may also incorrectly determine that the SR policy 1 is normal when no fault occurs on the IP path 1. In this example, because network devices through which the SR policy 1 passes and network devices through which the IP path 1 passes are not completely the same, a current BFD detection result cannot accurately reflect a fault status of the SR policy 1.

In another example, when BFD detection is performed on the SR policy 1 and an SR policy 1' (not shown in the figure), an operation to be performed may include: S21: The PE device 11 sends the BFD packet a and a BFD packet a' to the PE device 12 through the SR policy 1 and the SR policy 1' respectively. S22: The PE device 12 sends, through the P device 24 and the P device 23 in sequence in an IP routing manner, the response packet A corresponding to the BFD packet a and a response packet A' corresponding to the BFD packet a' to the PE device 11, that is, both the response packet A and the response packet A' are transmitted through the IP path 1. In this example, for the SR policy 1 and the SR policy 2, the IP paths 1 determined based on the IP routing manner are the same. In this case, even if no fault occurs on a device or a link through which the SR policy 1 passes while a fault occurs on a device or a link through which the SR policy 1' passes, because transmission paths of BFD response packets of the SR policy 1 and the SR policy 1' are both the IP path 1, as long as a fault occurs on the device or the link included in the IP path 1, the PE 11 determines, based on that no response packet is received, that a fault exists on the SR policy 1 and the SR policy 1'. As a result, path-level fine-grained detection cannot be implemented.

In view of this, embodiments of this application provide a fault detection method. If a second network device needs to perform BFD detection on a first forwarding path in a first SR policy to a first network device, for example, an operation to be performed may include: The second network device sends a first BFD packet to the first network device through the first forwarding path in the first SR policy. The first BFD packet includes indication information of a first SID list. When receiving the first BFD packet, the first network device can determine, based on the indication information of the first SID list, a second forwarding path that is reversely co-routed with the first forwarding path, so that the first network device can send a first response packet of the first BFD packet to the second network device through the second forwarding path. The first response packet indicates the second network device to perform fault detection on the first forwarding path. In this way, a transmitting end of BFD detection includes indication information of a SID list in a BFD packet, so that a receiving end can determine, based on the indication information of the SID list, a forwarding path that is reversely co-routed with a forwarding path through which the BFD packet is transmitted, and send a response packet of the BFD packet to the transmitting end through the determined forwarding path. That a real forwarding path of the BFD packet is reversely co-routed with a real forwarding path of the response packet is ensured, to implement accurate fault detection on a forwarding path in the SR policy, so that precision and accuracy of fault detection on the SR policy by a BFD mechanism are improved.

For ease of understanding embodiments of this application, the following first explains meanings of some concepts in embodiments of this application.

The SR policy is a tunnel applicable to SR. The SR policy may include at least one candidate path, and each candidate path includes at least one forwarding path. When traffic is forwarded through an SR policy, a preference value of each candidate path of the SR policy may be checked first, and a candidate path with a highest preference value is selected as an effective candidate path (which may be also referred to as an active candidate path). Then, if the effective candidate path includes one forwarding path, the traffic is sent by using a SID list corresponding to the forwarding path. If the effective candidate path includes at least two forwarding paths, a load sharing proportion of each forwarding path for the traffic is determined by using a weight corresponding to a SID list of each forwarding path, so that a corresponding proportion of traffic is sent by using the SID list corresponding to each forwarding path.

Figure 2:
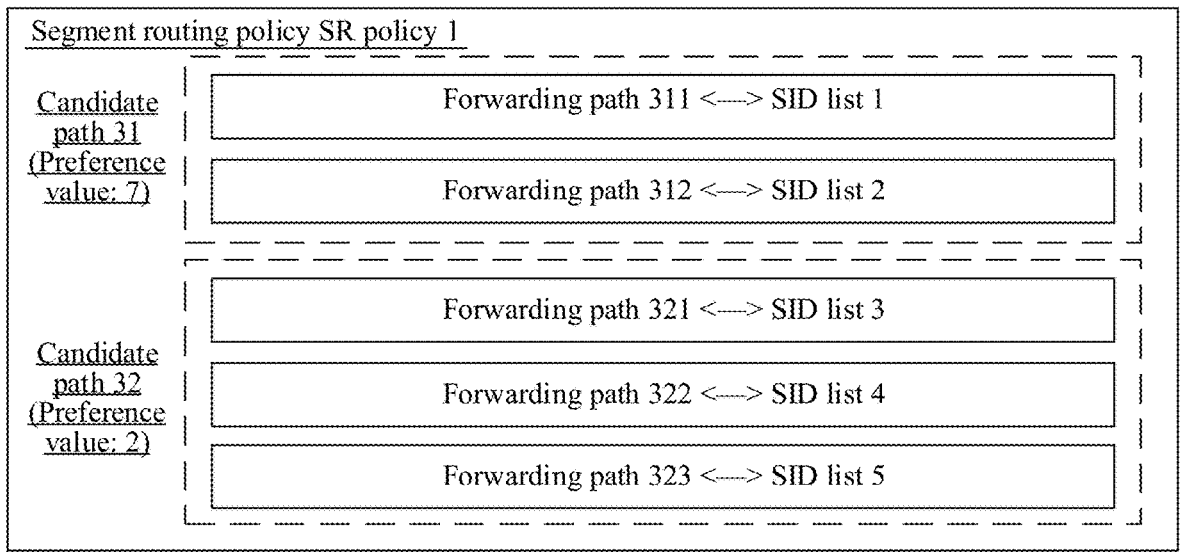
FIG. 2 is a schematic diagram of a structure of an SR policy according to an embodiment of this application.

The SR policy 1 shown in FIG. 1 is used as an example. It is assumed that the SR policy 1 includes a candidate path 31 and a candidate path 32, as shown in FIG. 2. The candidate path 31 includes a forwarding path 311 and a forwarding path 312, and the candidate path 32 includes a forwarding path 321, a forwarding path 322, and a forwarding path 323. A preference value corresponding to the candidate path 31 is 7, a preference value corresponding to the candidate path 32 is 2, weights corresponding to the forwarding path 311 and the forwarding path 312 are 0.6 and respectively, weights corresponding to the forwarding path 321, the forwarding path 322, and the forwarding path 323 are 0.3, 0.4, and 0.3 respectively, and SID lists corresponding to the forwarding path 311, the forwarding path 312, the forwarding path 321, the forwarding path 322, and the forwarding path 323 are a SID list 1 to a SID list 5 respectively. In this case, for traffic transmitted through the SR policy 1, when the SR policy 1 is normal, the traffic is divided into traffic x and traffic y at a ratio of 6:4. The traffic x is transmitted through the forwarding path 311 in the SR policy 1, and the traffic y is transmitted through the forwarding path 312 in the SR policy 1.

The SR policy may be an SR-MPLS policy, corresponding to a multi-protocol label switching (MPLS) network scenario; or the SR policy may be an SRv6 policy, corresponding to an internet protocol version 6 (IPv6). In an SR-MPLS policy scenario, the SID list corresponds to an MPLS label stack. The SID list may include an MPLS label corresponding to at least one network device or link. In an SRv6 policy scenario, the SID list corresponds to an IPv6 address list. The SID list may include an IPv6 address corresponding to at least one network device or link. A SID list corresponding to traffic that needs to be transmitted through the SR policy 1 is encapsulated to a packet header.

Reverse co-routing may include SR policy reverse co-routing (for example, in a case that the SR policy includes only one forwarding path) and reverse co-routing of a forwarding path in the SR policy (for example, in a case that the SR policy includes a plurality of forwarding paths). The SR policy reverse co-routing may mean that sequences of network devices and links that are passed through in sequence and that are determined based on two SR policies are opposite. For example, in the network system shown in FIG. 1, the SR policy 1 includes the PE device 11, a link between the PE device 11 and the P device 21, the P device 21, a link between the P device 21 and the P device 22, the P device 22, a link between the P device 22 and the PE device 12, and the PE device 12 in sequence. An SR policy 3 includes the PE device 12, a link between the PE device 12 and the P device 22, the P device 22, a link between the P device 22 and the P device 21, the P device 21, a link between the P device 21 and the PE device 11, and the PE device 11 in sequence. Therefore, it is determined that the SR policy 1 and the SR policy 3 are reversely co-routed tunnels. A reversely co-routed forwarding path in the SR policy may be two forwarding paths whose SIDs included in SID lists corresponding to the forwarding paths have an opposite sequence. The reversely co-routed forwarding paths may respectively belong to two reversely co-routed SR policies. For example, a SID included in the SID list is an MPLS label corresponding to the network device. In the network system shown in FIG. 1, a forwarding path 41 in the SR policy 1 corresponds to a SID list <41021, 41022, 41012>. 41021, 41022, and 41012 are SIDs corresponding to the P device 21, the P device 22, and the PE device 12 in the SR policy 1 respectively. A forwarding path 42 corresponds to a SID list <42022, 42021, 42011>. 42022, 42021, and 42011 are SIDs corresponding to the P device 22, the P device 21, and the PE device 11 in the SR policy 3 respectively. It can be learned that sequences of network devices determined by the forwarding path 41 and the forwarding path 42 based on the corresponding SID list are opposite. The forwarding path 42 may belong to the SR policy 3 that is reversely co-routed with the SR policy 1. Therefore, it is determined that the forwarding path 41 and the forwarding path 42 are reversely co-routed forwarding paths. It should be noted that, sequences of SIDs included in two SID lists corresponding to two reversely co-routed forwarding paths are not necessarily in a reverse sequence relationship. Content of the SIDs included in the two SID lists may be substantially completely different, but network devices and links through which forwarding paths pass and that are determined based on the SIDs included in the two SID lists are the same. For example, in the foregoing example, the SID list of the forwarding path 42 is not <41012, 41022, 41021>, but <42022, 42021, 42011>. However, an appearance sequence of network devices indicated by <42022, 42021, 42011> is opposite to an appearance sequence of network devices indicated by the SID list of the forwarding path 41.

It should be noted that a SID included in a SID list corresponding to a forwarding path may include a SID corresponding to a network device in the forwarding path. For example, the SID list corresponding to the forwarding path 41 includes a SID corresponding to the P device 21, a SID corresponding to the P device 22, and a SID corresponding to the PE device 12. Alternatively, a SID included in a SID list corresponding to a forwarding path may include a SID corresponding to a link in the forwarding path. For example, the SID list corresponding to the forwarding path 41 includes a SID corresponding to the link from the PE device 11 to the P device 21, a SID corresponding to the link from the P device 21 to the P device 22, and a SID corresponding to the link from the P device 22 to the PE device 12. Alternatively, a SID included in a SID list corresponding to a forwarding path may include both a SID corresponding to a network device in the forwarding path and a SID corresponding to a link in the forwarding path. For another example, the SID list corresponding to the forwarding path 41 includes the SID corresponding to the link from the PE device 11 to the P device 21, the SID corresponding to the P device 22, and the SID corresponding to the link from the P device 22 to the PE device 12, or the SID list corresponding to the forwarding path 41 includes the SID corresponding to the link from the PE device 11 to the P device 21, the SID corresponding to the P device 21, the SID corresponding to the link from the P device 21 to the P device 22, the SID corresponding to the P device 22, the SID corresponding to the link from the P device 22 to the PE device 12, and the SID corresponding to the PE device 12. Alternatively, a SID list corresponding to a forwarding path may be another possible case, for example, another possible appropriate type, arrangement manner, or combination manner of different types.

Types of the SIDs included in the SID lists corresponding to the two reversely co-routed forwarding paths may be the same or may be different. For example, in an embodiment, the SID list corresponding to the forwarding path 41 includes the SIDs of each network device and each link in the forwarding path 41, and a SID list corresponding to the forwarding path 42 that is reversely co-routed with the forwarding path 41 includes SIDs of the network device and the link in the forwarding path 42. For another example, when link cost values are the same, the SID list corresponding to the forwarding path 41 may include a SID corresponding to each network device in the forwarding path 41, but does not include a SID of each link. The SID list corresponding to the forwarding path 42 that is reversely co-routed with the forwarding path 41 includes a SID of the network device in the forwarding path 42. For another example, the SID list corresponding to the forwarding path 41 includes a SID of each link in the forwarding path 41. The SID list corresponding to the forwarding path 42 that is reversely co-routed with the forwarding path 41 includes a SID of each network device in the forwarding path 42, or the SID list corresponding to the forwarding path 42 includes both the SID corresponding to the network device in the forwarding path 42 and the SID corresponding to the link in the forwarding path 42. Even in some possible cases, the SID list corresponding to the forwarding path 41 is allowed to only carry SIDs indicating a part of network devices and/or links in the forwarding path 41, the SID list corresponding to the forwarding path 42 is also allowed to only carry SIDs indicating a part of network devices and/or links in the forwarding path 42, and the indicated network devices and/or links are allowed to be different from those in the SID list corresponding to the forwarding path 41. However, the reversely co-routed forwarding paths 41 and 42 may still be determined based on the two SID lists and a network topology. The foregoing is merely used as an example. Content included in the two SID lists may alternatively be designed to another manner with reference to an application scenario, provided that two reversely co-routed forwarding paths on which network devices and links appear in an opposite sequence can be determined based on the two SID lists.

The foregoing descriptions relate to a case in which two reversely co-routed forwarding paths pass through a same network device and a same link. In other possible settings, a condition that needs to be met by the two reversely co-routed paths is allowed to be appropriately relaxed within a reasonable range with reference to an actual application scenario, a networking structure, device deployment, and the like. For example, passing through a proportion of same network devices and/or links is used as a specified condition, or passing through same network devices and/or links is used as a specified condition. These settings should be reasonable in a corresponding network scenario. In comparison with a manner in which a response packet is forwarded completely based on an IP in the background of this application, accuracy of BFD detection can be improved.

For example, in the network system shown in FIG. 1, according to the fault detection method provided in embodiments of this application, a process of performing BFD detection on the forwarding path 41 in the SR policy 1 may include: S31: The PE device 11 sends a BFD packet c to the PE device 12 through the forwarding path 41 in the SR policy 1, where the BFD packet c includes indication information p of a SID list. S32: After receiving the BFD packet c, the PE device 12 determines, based on the indication information of the SID list in the BFD packet c, the forwarding path 42 that is reversely co-routed with the forwarding path 41. S33: The PE device 12 sends a response packet C of the BFD packet c to the PE device 11 through the forwarding path 42. S34: If the PE device 11 receives the response packet C, the PE device 11 may perform fault detection on the forwarding path 41 based on the response packet C, for example, determine that the forwarding path

41 is normal. S35: If the PE device 11 receives no response packet C within a preset time, the PE device 11 may determine that a fault exists on the forwarding path 41. Because a transmission path of the response packet C and a transmission path of the BFD packet c are reversely co-routed, accuracy of a BFD detection result can be ensured. In this way, when BFD detection is performed on the SR policy, it is not only ensured that the BFD packet and the corresponding response packet can be transmitted in a reversely co-routed manner, to achieve accurate fault detection, but also fault detection can be performed on any forwarding path in the SR policy, to implement finer-grained and more accurate BFD detection.

In the network system shown in FIG. 1, PE devices may be indirectly connected to each other through one or more forwarding devices. The forwarding devices include but are not limited to a P device.

It should be noted that the network device in embodiments of this application may be a device such as a router, a switch, a forwarder, or a firewall that can carry a service.

It should be noted that the method provided in embodiments of this application may be applied to a scenario with a bidirectional virtual private network (VPN) connection service. In this scenario, a VPN service and a carried tunnel are deployed between PE devices, and BFD detection is enabled by the tunnel, to implement quick fault detection. The tunnel carried between the PE devices may be of, for example, a type such as the SRv6 policy, the SR-MPLS policy, or the like.

It should be noted that, the method provided in embodiments of this application may support, for example, static BFD detection, dynamic BFD detection, or seamless bidirectional forwarding detection (SBFD). The BFD packet may be for checking connectivity of paths that carry a service.

For ease of understanding the fault detection method provided in embodiments of this application, the following describes the method with reference to the accompanying drawings.

Figures 3, 4A:
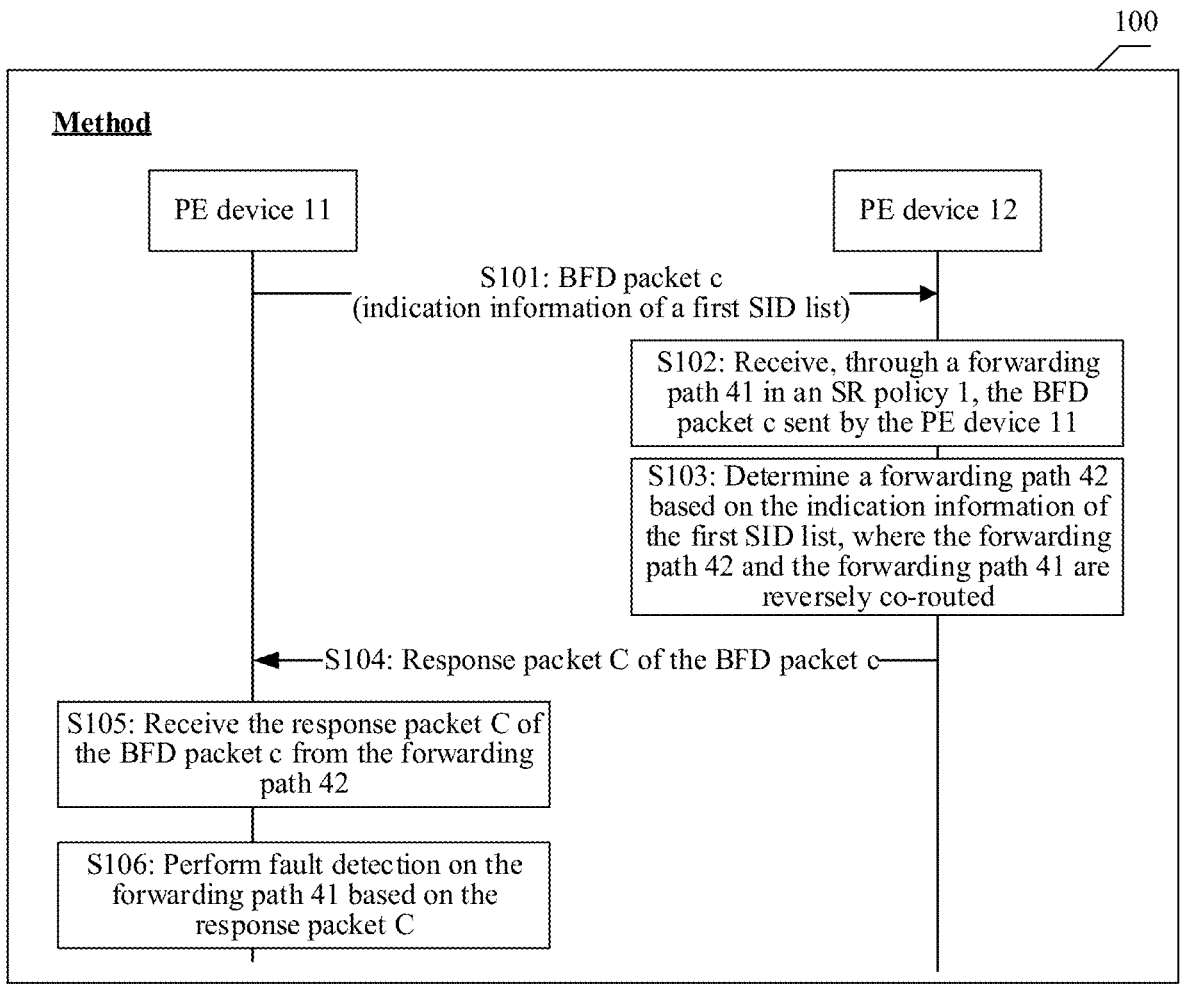
FIG. 3 is a flowchart of a fault detection method 100 according to an embodiment of this application.
FIG. 4a is a schematic diagram of a format of a sub-TLV field in a BGP SR policy packet according to an embodiment of this application.

FIG. 3 is a schematic flowchart of a fault detection method 100 according to an embodiment of this application. The method 100 may be applied to a network scenario including a first network device and a second network device. In an example, the first network device may be an egress PE device in a to-be-detected SR policy, and the second network device is an ingress PE device in the SR policy. For ease of understanding, in the structure of the network system shown in FIG. 1, an embodiment of the application is described by using a manner in which the PE device 11 interacts with the PE device 12 when the forwarding path 41 in the SR policy 1 is detected. The first network device corresponds to the PE device 12 in FIG. 1, and the second network device corresponds to the PE device 11. During implementation, the method 100 may include, for example, the following S101 to S106.

S101: The PE device 11 sends a BFD packet c to the PE device 12 through the forwarding path 41 in the SR policy 1. The BFD packet c includes indication information of a first SID list.

S102: The PE device 12 receives, through the forwarding path 41 in the SR policy 1, the BFD packet c sent by the PE device 11.

The indication information of the first SID list may be the first SID list itself. For example, the indication information of the first SID list may be a SID list corresponding to a forwarding path 42: <42022, 42021, 42011>. Alternatively, the indication information of the first SID list may be an identifier of the first SID list, and the identifier of the first SID list may include but is not limited to a path segment corresponding to the first SID list or a binding segment identifier (binding SID, BSID) corresponding to the first SID list. For example, the indication information of the first SID list may be a BSID 420 that can indicate <42022, 42021, and 42011>.

Before S101, the PE device 11 and the PE device 12 may store the indication information of the first SID list, to cooperate to implement the method 100.

In an embodiment, if the network system does not include a control management device, the indication information of the first SID list may be generated by the PE device 11 or the PE device 12.

In one case, the indication information of the first SID list may be generated by the PE device 11. In this case, the PE device 11 may further send the indication information of the first SID list to the PE device 12, so that the PE device 12 can determine, based on the indication information of the first SID list, a forwarding path that is reversely co-routed with the forwarding path 41 for a response packet C corresponding to the BFD packet c. In another case, the indication information of the first SID list may alternatively be generated by the PE device 12. In this case, the PE device 12 may send the indication information of the first SID list to the PE device 11, so that the PE device 11 can include the indication information of the first SID list in the sent BFD packet c, to ensure that BFD detection on the forwarding path 41 is effectively performed.

In an example, the indication information of the first SID list is a BSID corresponding to the forwarding path 41. Both the PE device 11 and the PE device 12 may obtain indication information corresponding to the first SID list: BSID 410. In this way, the PE device 12 may store a mapping relationship between the BSID 410 and the forwarding path 42. Alternatively, the PE device 12 may store a mapping relationship between the BSID 410 and the BSID 420 corresponding to the forwarding path 42, and a mapping relationship between the BSID 420 and the forwarding path 42, to ensure that the PE device 12 can determine the forwarding path 42 based on the indication information of the first SID list in the BFD packet c. The BSID 420 may be indication information of the SID list corresponding to the forwarding path 42, and may be allocated by the PE device 11 or the PE device 12 to the forwarding path 42.

In another example, the indication information of the first SID list may alternatively indicate the SID list corresponding to the forwarding path 42. In one case, the indication information of the first SID list may be generated by the PE device 12. In this case, the PE device 12 may send the indication information of the first SID list to the PE device 11, so that the PE device 11 can include the indication information of the first SID list in the sent BFD packet c, to ensure that BFD detection on the forwarding path 41 is effectively performed. In another case, the indication information of the first SID list may alternatively be generated by the PE device 11. In this case, the PE device 11 may further send the indication information of the first SID list to the PE device 12, so that the PE device 12 can determine, based on the indication information of the first SID list, a forwarding path that is reversely co-routed with the forwarding path 41 for the response packet C corresponding to the BFD packet c. For example, the indication information of the first SID list is a Path Segment corresponding to the forwarding path 42. Both the PE device 11 and the PE device 12 may obtain the indication information corresponding to the first SID list: a Path Segment 420. In this way, the PE device 12 can determine the forwarding path 42 based on the indication information of the first SID list in the BFD packet c.

It should be noted that the PE 11 or the PE 12 may further generate indication information of a second SID list. If the indication information of the first SID list indicates a SID list corresponding to the forwarding path 41, the indication information of the second SID list may indicate the SID list corresponding to the forwarding path 42. If the indication information of the first SID list indicates the SID list corresponding to the forwarding path 42, the indication information of the second SID list may indicate the SID list corresponding to the forwarding path 41.

In an embodiment, if the network system includes the control management device, the indication information of the first SID list may be sent by the control management device to the PE device 11 and the PE device 12.

In an example, the control management device may generate the indication information of the first SID list, and send the indication information of the first SID list to the PE device 11 and the PE device 12. For example, the control management device sends a message 51 to the PE device 11 or the PE device 12. The message 51 carries the indication information of the first SID list. In this way, a PE device that receives the indication information of the first SID list from the control management device may further forward the indication information of the first SID list to a PE device at the other end in the SR policy 1. For another example, the control management device sends a message 52 to the PE device 11 and the PE device 12. The message 52 carries the indication information of the first SID list.

In another example, the PE device 11 or the PE device 12 may alternatively generate the indication information of the first SID list, and send the indication information of the first SID list to the control management device. The control management device sends the indication information of the first SID list to the PE device 11 and the PE device 12. For example, the PE device 11 or the PE device 12 sends a message 61 to the control management device. The message 61 carries the indication information of the first SID list. After receiving the message 61, the control management device obtains the indication information of the first SID list from the message 61, and sends a message 53 to the PE device 11 and the PE device 12. The message 53 carries the indication information of the first SID list. Before receiving the message 61, the control management device may further send related information about the SR policy 1 and an SR policy 3 to the PE device 11 and the PE device 12, indicate the PE device 11 or the PE device 12 to allocate corresponding indication information (including the indication information of the first SID list) of a SID list to each forwarding path in the SR policy 1 and the SR policy 3, and send the indication information to the control management device by including the indication information in the message 61.

In the foregoing two examples, the message 51, the message 52, the message 53, or the message 61 may further include the indication information of the second SID list. The indication information of the second SID list may indicate the forwarding path 41, and the indication information of the first SID list indicates the forwarding path 42; or the indication information of the second SID list may indicate the forwarding path 42, and the indication information of the first SID list indicates the forwarding path 41.

The message 51, the message 52, and the message 53 may be, for example, a border gateway protocol segment routing policy (BGP SR policy) packet. The BGP SR policy packet may carry the indication information of the first SID list by using an extended sub type length value (sub-TLV) field. As shown in FIG. 4a, a sub-TLV field that is in the BGP SR policy packet and that is for carrying the indication information of the first SID list may include a type field, a length field, a reserved field, and a value field. A value of the type field indicates that the sub-TLV field carries the indication information of the first SID list, a value of the length field indicates a length of the value field in the sub-TLV field, and a value of the value field includes the indication information of the first SID list. If the BGP SR policy packet further carries the indication information of the second SID list, in one case, the indication information of the first SID list and the indication information of the second SID list may be carried in a same sub-TLV field. A format of the sub-TLV field is shown in FIG. 4b. In addition to a type field, a length field, a reserved field, and a value field, a flags field may further be included. A value of the flags field indicates a quantity of pieces of indication information of a SID list carried in the sub-TLV field and the indication information of the SID list indicates a forwarding path. For example, a value of one bit of the flags field indicates that the value field in the sub-TLV field includes the indication information of the first SID list, a value of another bit of the flags field indicates that the value field in the sub-TLV field includes the indication information of the second SID list, and the value field in the sub-TLV field includes the indication information of the first SID list and the indication information of the second SID list. In another case, the indication information of the first SID list and the indication information of the second SID list may be respectively carried in two sub-TLV fields in the BGP SR policy packet. For a format of each sub-TLV field, refer to FIG. 4a. The value field in the sub-TLV field for carrying the indication information of the first SID list includes the indication information of the first SID list, and the value field in the sub-TLV field for carrying the indication information of the second SID list includes the indication information of the second SID list. For example, the indication information of the SID list is a BSID. If the SR policy is an SRv6 policy, the value of the value field in FIG. 4a or FIG. 4b is an IPv6 address. If the SR policy is an SR-MPLS policy, the value of the value field in FIG. 4a or FIG. 4b is an MPLS label. For a format of the value field, refer to FIG. 4c, and the value field includes a label field, a traffic level (Exp (also referred to as TC)) field, a flags (S) field, and a time to live (TTL) field. The TC field, the S field, and the TTL field are reserved fields, and may be set to 0.

The message 61 may be, for example, a border gateway protocol link state (BGP-LS) packet. The BGP-LS packet may use a sub-TLV field in a SID list TLV field defined in a BGP-LS protocol to carry the indication information of the first SID list. A format of the SID list TLV field defined in the BGP-LS protocol in the BGP-LS packet is shown in FIG. 5a. The SID list TLV field may include a type field, a length field, a flags field, a reserved field, a message type identifier (MT ID) field, an algorithm field, a weight field, and at least one sub-TLV field whose length is variable. As shown in FIG. 5b, the sub-TLV field in the BGP-LS packet for carrying the indication information of the first SID list may include a type field, a length field, and a value field. A value of the type field indicates that the sub-TLV field carries the indication information of the first SID list, a value of the length field indicates a length of the value field in the sub-TLV field, and a value of the value field includes the indication information of the first SID list. If the BGP-LS packet further carries the indication information of the second SID list, in one case, the indication information of the first SID list and the indication information of the second SID list may be carried in a sub-TLV field. A format of the sub-TLV field is shown in FIG. 5c, in addition to a type field, a length field, and a value field, a flags field may further be included. A value of the flags field indicates a quantity of pieces of indication information of a SID list carried in the sub-TLV field and indication information of each SID list indicates a forwarding path. For example, a value of a first bit of the flags field indicates that the value field in the sub-TLV field includes the indication information of the first SID list, a value of a second bit of the flags field indicates that the value field in the sub-TLV field includes the indication information of the second SID list, and the value field in the sub-TLV field includes the indication information of the first SID list and the indication information of the second SID list. In another case, the indication information of the first SID list and the indication information of the second SID list may be respectively carried in two sub-TLV fields in the BGP-LS packet. For a format of each sub-TLV field, refer to FIG. 5b. A value field in the sub-TLV field for carrying the indication information of the first SID list includes the indication information of the first SID list, and a value field in the sub-TLV field for carrying the indication information of the second SID list includes the indication information of the second SID list. For example, the indication information of the SID list is a BSID. If the SR policy is an SRv6 policy, the value of the value field in FIG. 5b or FIG. 5c is an IPv6 address. If the SR policy is an SR-MPLS policy, the value of the value field in FIG. 5b or FIG. 5c is an MPLS label. For a format of the value field, refer to FIG. 4c.

It is assumed that the message 51, the message 52, the message 53, and the message 61 all include the indication information of the first SID list and the indication information of the second SID list. In one case, if the indication information of the first SID list and the indication information of the second SID list in the message 51, the message 52, or the message 53 are carried in one sub-TLV field, the indication information of the first SID list and the indication information of the second SID list in the message 61 may also be carried in one sub-TLV field. In another case, if the indication information of the first SID list and the indication information of the second SID list in the message 51, the message 52, or the message 53 are carried in two sub-TLV fields, the indication information of the first SID list and the indication information of the second SID list in the message 61 may also be carried in two sub-TLV fields.

In addition, the message 51, the message 52, the message 53, and the message 61 may alternatively be a network configuration protocol (NETCONF) packet or a path computation element communication protocol (PCEP) packet for carrying the indication information of the first SID list. Implementation is not described in an embodiment of the application.

It should be noted that, when the indication information of the first SID list is interacted between the PE device 11 and the PE device 12, the to-be-interacted indication information of the first SID list may be carried in a BGP packet. For example, the indication information of the first SID list may be carried in a TLV field or the sub-TLV field in the BGP packet.

In an embodiment of the application, the indication information of the SID list may be a BSID corresponding to the SID list. The BSID is different from a BSID allocated to a candidate path in a current SR policy. The BSID corresponding to the candidate path indicates the candidate path but cannot identify a forwarding path in the candidate path. The BSID corresponding to the candidate path may be referred to as a Path BSID (P-BSID for short). The BSID corresponding to the forwarding path in this application indicates a forwarding path, and may be referred to as a SID list-level BSID (L-BSID for short). In an embodiment of the application, the BSID that appears in the context and that indicates the forwarding path is mainly the L-BSID. The foregoing explanation mainly indicates that the BSID that needs to be used to implement reverse co-routed detection in this application is at a SID list level, but does not indicate that content of the P-BSID and content of the L-BSID in a same SR policy cannot be the same. For example, for at least a case in which the candidate path in the SR policy includes only one SR list, values of the P-BSID and the L-BSID may be the same. In this case, the indication information of the SID list may even be interpreted as the BSID corresponding to the candidate path.

For example, when the control management device sends the indication information of the first SID list to the PE device 11 and the PE device 12, and the indication information of the first SID list is the L-BSID, an operation that needs to be performed before 5101 may include:

S41: The control management device establishes the SR policy 1 and an SR policy 2 from the PE device 11 to the PE device 12, and an SR policy 3 and an SR policy 4 from the PE device 12 to the PE device 11.

S42: The control management device allocates the L-BSID to a forwarding path in each SR policy, including, for example, the following:

For a direction from the PE device 11 to the PE device 12, configurations are as follows:

A primary SR policy is the SR policy 1, the SR policy 1 includes the forwarding path 41, the SID list of the forwarding path 41 is <41021, 41022, 41012>, and an L-BSID corresponding to the forwarding path 41 is 410.

A standby SR policy is the SR policy 2, the SR policy 2 includes a forwarding path 43, a SID list of the forwarding path 43 is <43023, 43024, 43012>, and an L-BSID corresponding to the forwarding path 43 is 430.

For a direction from the PE device 12 to the PE device 11, configurations are as follows:

The primary SR policy is the SR policy 3, the SR policy 3 includes a forwarding path 42, a SID list of the forwarding path 42 is <42022, 42021, 42011>, and an L-BSID corresponding to the forwarding path 42 is 420.

The standby SR policy is the SR policy 4, the SR policy 4 includes a forwarding path 44, a SID list of the forwarding path 44 is <44024, 44023, 44011>, and an L-BSID corresponding to the forwarding path 44 is 440.

S43: The control management device sends the related configurations of the SR policy 1 and the SR policy 2 to the PE device 11, and sends the L-BSID of the forwarding path 42 that is reversely co-routed with the forwarding path 41 in the SR policy 1 and the L-BSID of the forwarding path 44 that is reversely co-routed with the forwarding path 43 in the SR policy 2. The control management device sends the related configurations of the SR policy 3 and the SR policy 4 to the PE device 12, and sends the L-BSID of the forwarding path 41 that is reversely co-routed with the forwarding path 42 in the SR policy 3 and the L-BSID of the forwarding path 42 that is reversely co-routed with the forwarding path 44 in the SR policy 4, including:

Content sent by the control management device to the PE device 11 is as follows:

The SID list of the forwarding path 41 in the primary SR policy 1 is <41021, 41022, 41012>, the L-BSID corresponding to the forwarding path 41 is 410, and the L-BSID corresponding to the reversely co-routed forwarding path 42 is 420.

The SID list of the forwarding path 43 in the standby SR policy 2 is <43023, 43024, 43012>, the L-BSID corresponding to the forwarding path 43 is 430, and the L-BSID corresponding to the reversely co-routed forwarding path 44 is 440.

Content sent by the control management device to the PE device 12 is as follows:

The SID list of the forwarding path 42 in the primary SR policy 3 is <42022, 42021, 42011>, the L-BSID corresponding to the forwarding path 42 is 420, and the L-BSID corresponding to the reversely co-routed forwarding path 41 is 410.

The SID list of the forwarding path 44 in the standby SR policy 4 is <44024, 44023, 44011>, the L-BSID corresponding to the forwarding path 44 is 440, and the L-BSID corresponding to the reversely co-routed forwarding path 43 is 430.

In this case, the indication information of the first SID list is configured, the BFD packet c carries the indication information of the first SID list, and the BFD packet c is sent to the PE device 12 through the forwarding path 41 in the SR policy 1, and the PE device 11 initiates fault detection on the forwarding path 41 in the SR policy 1. Similarly, the method provided in an embodiment of the application is also applicable to fault detection performed by the PE device 11 on another forwarding path included in the SR policy 1. An embodiment is the same as a manner of performing fault detection on the forwarding path 41. Details are not described herein again.

The control management device in an embodiment of the application may be any device that can control and manage a device in a network system, for example, may be a software-defined networking (SDN) controller.

S103: The PE device 12 determines the forwarding path 42 based on the indication information of the first SID list. The forwarding path 42 and the forwarding path 41 are reversely co-routed.

The indication information of the first SID list indicates the PE device 12 to determine the forwarding path 42 through which the response packet C of the BFD packet c is sent. The forwarding path 42 and the forwarding path 41 are reversely co-routed.

In an embodiment, after the PE device 12 receives, through the forwarding path 41, the BFD packet c sent by the PE device 11, the PE device 12 obtains the indication information of the first SID list by parsing the BFD packet c. Therefore, the PE device 12 may determine, based on the indication information of the first SID list, the forwarding path 42 that is reversely co-routed with the forwarding path 41, so that the BFD packet c and the response packet C can be transmitted through forwarding paths that are reversely co-routed. This is prepared for completing accurate fault detection.

In an example, if the indication information of the first SID list indicates the SID list corresponding to the forwarding path 42, in S103, the PE device 12 may directly determine the forwarding path 42 based on the indication information of the first SID list.

In another example, if the indication information of the first SID list indicates the SID list corresponding to the forwarding path 41, in one case, it is assumed that the PE device 12 stores a mapping relationship between the indication information of the first SID list and the indication information of the second SID list, and the indication information of the second SID list indicates the SID list corresponding to the forwarding path 42, for example, S103 may include: The PE device 12 determines the indication information of the second SID list based on the indication information of the first SID list. Then, the PE device 12 determines the forwarding path 42 based on the indication information of the second SID list. In another case, it is assumed that the PE device 12 stores a mapping relationship between the indication information of the first SID list and the forwarding path 42. In this case, in S103, the PE device 12 may alternatively directly determine the forwarding path 42 based on the indication information of the first SID list.

S104: The PE device 12 sends the response packet C of the BFD packet c to the PE device 11 through the forwarding path 42. The response packet C indicates the PE device 11 to perform fault detection on the forwarding path 41.

In some possible cases, if a fault exists, when S104 is performed, on a network device or a link through which the forwarding path 42 passes, alternatively, if a fault exists, before S104 is performed, on a network device or a link through which the forwarding path 41 passes, the PE device 11 may not be capable of receiving the response packet C. In this case, the PE device 11 receives no response packet C through the forwarding path 42 within a preset time (for example, 1 second), because the forwarding path 41 and the forwarding path 42 are reversely co-routed, it may be determined that a fault exists on the forwarding path 41.

In some other possible cases, if the network device and the link through which the forwarding path 42 passes are both normal when S104 is performed, an embodiment of the application may further include S105 and S106, to determine that no fault exists on the forwarding path 41.

S105: The PE device 11 receives the response packet C of the BFD packet c from the forwarding path 42.

S106: The PE device 11 performs fault detection on the forwarding path 41 based on the response packet C.

In an embodiment, S106 may be: The PE device 11 determines, based on the received response packet C, that the forwarding path 41 and the forwarding path 42 through which the BFD packet c and the response packet C are transmitted are both normal. Because the forwarding path 41 and the forwarding path 42 are reversely co-routed, it is determined that no fault exists on the forwarding path 41.

It can be learned that according to the method 100, a transmitting end of BFD detection includes the indication information of the SID list in the BFD packet, so that a receiving end can determine, based on the indication information of the SID list, the forwarding path that is reversely co-routed with the forwarding path through which the BFD packet is transmitted, and send a response packet of the BFD packet to the transmitting end through the determined forwarding path. That a real forwarding path of the BFD packet is reversely co-routed with a real forwarding path of the response packet is ensured, to implement accurate fault detection on a forwarding path in the SR policy, so that precision and accuracy of fault detection on the SR policy by the BFD mechanism are improved.

In an embodiment, considering that bidirectional co-routed SR policies are established, for example, the control management device can create the SR policy 1 and the SR policy 3 that are bidirectional co-routed, and implement association between a forward forwarding path and a reverse forwarding path in the SR policy 1 and the SR policy 3. Therefore, bidirectional fault detection can be implemented by using the BFD mechanism. The foregoing method 100 describes only fault detection performed by the PE device 11 on the forwarding path 41 in the SR policy 1. Similarly, an embodiment of the application may further include the following method 200, to implement fault detection performed by a PE device 12 on a forwarding path 42 in an SR policy 3. The forwarding path 42 and a forwarding path 41 are reversely co-routed. In an embodiment, the method 200 may include, for example, the following operations.

S201: The PE device 12 sends a BFD packet d to a PE device 11 through the forwarding path 42 in the SR policy 3. The BFD packet d includes indication information of a third SID list.

S202: The PE device 11 receives the BFD packet d sent by the PE device 12 through the forwarding path 42 in the SR policy 3. The BFD packet d includes the indication information of the third SID list.

S203: The PE device 11 determines the forwarding path 41 based on the indication information of the third SID list. The forwarding path 42 and the forwarding path 41 are reversely co-routed.

The indication information of the third SID list indicates the PE device 11 to determine the forwarding path 41 through which a response packet D of the BFD packet d is sent. The forwarding path 41 and the forwarding path 42 are reversely co-routed.

S204: The PE device 11 sends the response packet D of the BFD packet d to the PE device 12 through the forwarding path 41.

In some possible cases, if a fault exists, when S204 is performed, on a network device or a link through which the forwarding path 41 passes, alternatively, if a fault exists, before S204 is performed, on a network device or a link through which the forwarding path 42 passes, the PE device 12 may not be capable of receiving the response packet D. In this case, because the PE device 12 does not receive the response packet D, it may be determined that a fault exists on the forwarding path 42.

In some other possible cases, if the network device and the link through which the forwarding path 41 passes are both normal when S204 is performed, for example, an embodiment of the application may further include S205 and S206:

S205: The PE device 12 receives the response packet D from the forwarding path 41.

S206: The PE device 12 performs fault detection on the forwarding path 42 based on the response packet D.

The PE device 12 determines, based on the received response packet D, that the forwarding path 42 and the forwarding path 41 through which the BFD packet d and the response packet D are transmitted are both normal. Therefore, it is determined that no fault exists on the forwarding path 42.

For implementations and effects of S201 to S206, refer to related descriptions in the method 100. Details are not described herein again.

The method 200 may be implemented separately, or may be implemented as a whole with the method 100. If the method 100 and the method 200 are implemented as a whole, a sequence of implementing the method 100 and the method 200 is not limited.

In an embodiment, the SR policy from the PE device 11 to the PE device 12 is not only the SR policy 1. For example, to improve reliability of the network system, an SR policy 2 from the PE device 11 to the PE device 12 may be further constructed as a standby tunnel of the SR policy 1. For example, the control management device creates the SR policy 1 and the SR policy 2, and creates the SR policy 3 and the SR policy 4 that are reversely co-routed with the SR policy 1 and the SR policy 2. After a deployment is completed, BFD detection is performed on both the primary and standby SR policies according to the method provided in an embodiment of the application. An embodiment of the application may further include the following method 300, to implement fault detection on a forwarding path in another SR policy from a PE device 11 to a PE device 12. For example, the PE device 11 may perform fault detection on a forwarding path 43 in an SR policy 2. In an embodiment, the method 300 may include, for example, the following:

S301: The PE device 11 sends a BFD packet e to the PE device 12 through the forwarding path 43 in the SR policy 2. The BFD packet e includes indication information of a fourth SID list.

S302: The PE device 12 receives the BFD packet e sent by the PE device 11 through the forwarding path 43 in the SR policy 2. The BFD packet e includes the indication information of the fourth SID list.

S303: The PE device 12 determines a forwarding path 44 based on the indication information of the fourth SID list. The forwarding path 44 and the forwarding path 43 are reversely co-routed.

The indication information of the fourth SID list indicates the PE device 12 to determine the forwarding path 44 through which a response packet E of the BFD packet e is sent. The forwarding path 44 and the forwarding path 43 are reversely co-routed.

S304: The PE device 12 sends the response packet E of the BFD packet e to the PE device 11 through the forwarding path 44.

In some possible cases, if a fault exists, when S304 is performed, on a network device or a link through which the forwarding path 44 passes, alternatively if a fault exists, before S304 is performed, on a network device or a link through which the forwarding path 43 passes, the PE device 11 may not be capable of receiving the response packet E. In this case, because the PE device 11 does not receive the response packet E, it may be determined that a fault exists on the forwarding path 43.

In some other possible cases, if a network device and a link through which the forwarding path 44 passes are both normal when S304 is performed, for example, an embodiment of the application may further include S305 and S306.

S305: The PE device 11 receives the response packet E of the BFD packet e from the forwarding path 44.

S306: The PE device 11 performs fault detection on the forwarding path 43 based on the response packet E.

The PE device 11 determines, based on the received response packet E, that the forwarding path 43 and the forwarding path 44 through which the BFD packet e and the response packet E are transmitted are both normal. Therefore, it is determined that no fault exists on the forwarding path 43.

For implementations and effects of S301 to S306, refer to related descriptions in the method 100. Details are not described herein again.

The method 300 may be implemented independently, or may be implemented as a whole with the method 100, or may be implemented as a whole with the method 200, or may be implemented as a whole with the method 100 and the method 200. If the method 300 and the method are implemented as a whole, a sequence of implementation is not limited.

The following uses an example in which the control management device sends indication information of a first SID list to the PE device 11 and the PE device 12 in an SR-MPLS policy scenario, and the indication information of the first SID list is an L-BSID to describe formats of the BFD packet and the response packet corresponding to the BFD packet in the foregoing methods.

A format of a BFD packet c may be referred to FIG. 6a. The BFD packet c may include an MPLS label stack and a valid payload. The MPLS label stack may include: a SID list corresponding to a forwarding path 41: 41021, 41022, and 41012, and the indication information of the first SID list: L-BSID 420. A response packet C may include the MPLS label stack and the payload. The MPLS label stack may include: a SID list corresponding to a forwarding path 42: 42022, 42021, and 42011.

A format of a BFD packet d may be referred FIG. 6b. The BFD packet d may include an MPLS label stack and a payload. The MPLS label stack may include: a SID list corresponding to the forwarding path 42: 42022, 42021, and 42011, and indication information of a third SID list: L-BSID 410. The response packet C may include the MPLS label stack and the payload. The MPLS label stack may include: a SID list corresponding to the forwarding path 41: 41021, 41022, and 41012.

A format of the BFD packet e may be referred to FIG. 6c. The BFD packet c may include an MPLS label stack and a payload. The MPLS label stack may include: a SID list corresponding to the forwarding path 43: 43023, 43024, and 43012, indication information of a fourth SID list: L-BSID 440. The response packet C may include an MPLS label stack and a payload. The MPLS label stack may include a SID list corresponding to the forwarding path 44: 44024, 44023, and 44011.

In the foregoing BFD packet c, the BFD packet d, the BFD packet e, the response packet C, the response packet D, and the response packet E, the payload may include an internet protocol (IP), a user datagram protocol (UDP), and detection information. The detection information is BFD information.

It should be noted that, the SID list included in the MPLS label stack in the BFD packet and the response packet may be an MPLS label corresponding to each hop from the next-hop device to the egress PE device, as shown in FIG. 6a to FIG. 6c. Alternatively, the SID list included in the MPLS label stack in the BFD packet and the response packet may also be a SID list obtained after the MPLS label corresponding to the next-hop device is removed after the next hop is determined at the ingress PE device. For example, the MPLS label stack of the BFD packet c in FIG. 6a may include: a SID list corresponding to the forwarding path 41: 41022 and 41012.

It should be noted that, in FIG. 6a to FIG. 6c, a packet format is described by using the SR-MPLS policy scenario as an example. In an SRv6 policy scenario, if indication information of a SID list is carried in a segment routing header (SRH) in a packet, the indication information of the SID list carried in the SRH and a SID list corresponding to the forwarding path carried in the SRH may be an IPv6 address. In addition, although an embodiment of the application mainly describes a scenario in which an SR policy is used as a tunnel implementation technology, it is clear that the reverse co-routed detection method may be applied to another possible tunnel implementation technology in which a forwarding path can be specified in a manner. Therefore, an embodiment of the application further provides a fault detection method. In the method, a first network device receives a first detection packet sent by a second network device through a first forwarding path of a first tunnel. The first detection packet includes indication information of the first forwarding path; and the first network device determines a second forwarding path based on the indication information of the first forwarding path, and the second forwarding path and the first forwarding path are reversely co-routed. The first network device sends, through the second forwarding path, a first response packet of the first detection packet to the second network device. The first response packet indicates the second network device to perform detection on the first forwarding path. The detection packet may be a detection packet for implementing path fault detection, for example, a BFD packet or another fault detection packet, or may be another type of detection packet, for example, an operation, administration and maintenance (OAM) packet.

Based on the foregoing method embodiments, an embodiment of this application further provides a fault detection apparatus. The following describes the apparatus with reference to an accompanying drawing.

FIG. 7 is a schematic diagram of a structure of a fault detection apparatus 700 according to an embodiment of this application. The apparatus 700 is used in a first network device, for example, may perform a function of the PE device 12 in the embodiment shown in FIG. 1. The apparatus 700 may include a receiving unit 701, a determining unit 702, and a sending unit 703.

The receiving unit 701 is configured to receive, through a first forwarding path in a first SR policy, a first BFD packet sent by a second network device. The first BFD packet includes indication information of a first segment identifier list SID list.

When the apparatus 700 is used in the PE device 12 shown in FIG. 1, the receiving unit 701 receives, through the first forwarding path in the first SR policy, the first BFD packet sent by the second network device. In an embodiment, refer to S101 and S102 in the embodiment in FIG. 3.

The determining unit 702 is configured to determine a second forwarding path based on the indication information of the first SID list. The second forwarding path and the first forwarding path are reversely co-routed.

When the apparatus 700 is used in the PE device 12 shown in FIG. 1, the determining unit 702 determines the second forwarding path based on the indication information of the first SID list. In an embodiment, refer to S103 in the embodiment in FIG. 3.

The sending unit 703 is configured to send a first response packet of the first BFD packet to the second network device through the second forwarding path. The first response packet indicates the second network device to perform fault detection on the first forwarding path.

When the apparatus 700 is used in the PE device 12 shown in FIG. 1, the sending unit 703 sends the first response packet of the first BFD packet to the second network device through the second forwarding path. In an embodiment, refer to S104 in the embodiment in FIG. 3.

In an embodiment, the apparatus 700 may further include a generation unit. The generation unit is configured to: before the first BFD packet sent by the second network device through the first forwarding path in the first SR policy is received, generate the indication information of the first SID list.

In an embodiment, the receiving unit 701 is further configured to receive the indication information of the first SID list that is sent by the second network device.

In an embodiment, the receiving unit 701 is further configured to receive a message sent by a control management device. The message includes the indication information of the first SID list. In an example, the message further includes indication information of a second SID list. The indication information of the second SID list indicates the first forwarding path, and the indication information of the first SID list indicates the second forwarding path; or, the indication information of the second SID list indicates the second forwarding path, and the indication information of the first SID list indicates the first forwarding path. For example, the foregoing message may be a BGP SR policy packet, and the BGP SR policy packet carries the indication information of the first SID list by using a sub-TLV field.

In an example, the indication information of the first SID list indicates a SID list corresponding to the second forwarding path.

In another example, the indication information of the first SID list indicates a SID list corresponding to the first forwarding path, and the determining unit 702 is configured to determine the indication information of the second SID list based on the indication information of the first SID list and determine the second forwarding path based on the indication information of the second SID list.

In an embodiment, the sending unit 703 is further configured to send a second BFD packet to the second network device through the second forwarding path in the second SR policy. The second BFD packet includes indication information of a third SID list. The indication information of the third SID list indicates the first network device to determine the first forwarding path through which a second response packet of the second BFD packet is sent. The receiving unit 701 is further configured to receive the second response packet from the first forwarding path. In this case, the apparatus 700 further includes a detection unit, and the detection unit is configured to perform fault detection on the second forwarding path based on the second response packet.

In an embodiment, the receiving unit 701 is further configured to receive, through a third forwarding path in the first SR policy, a third BFD packet sent by the second network device. The third BFD packet includes indication information of a fourth SID list, and the third forwarding path is different from the first forwarding path. The determining unit 702 is further configured to determine a fourth forwarding path based on the indication information of the fourth SID list, and the fourth forwarding path and the third forwarding path are reversely co-routed. The sending unit 703 is further configured to send a third response packet of the third BFD packet to the second network device through the fourth forwarding path. The third response packet indicates the second network device to perform fault detection on the third forwarding path.

The indication information of the first SID list may be a path segment or a BSID, or the indication information of the first SID list may be the first SID list itself. Similarly, the indication information of the second SID list may alternatively be a path segment, a BSID, or the second SID list itself.

For functions and implementations that can be performed by the fault detection apparatus 700, refer to the corresponding descriptions of the PE device 12 in the embodiment shown in FIG. 3. Details are not described herein again.

Figure 8:
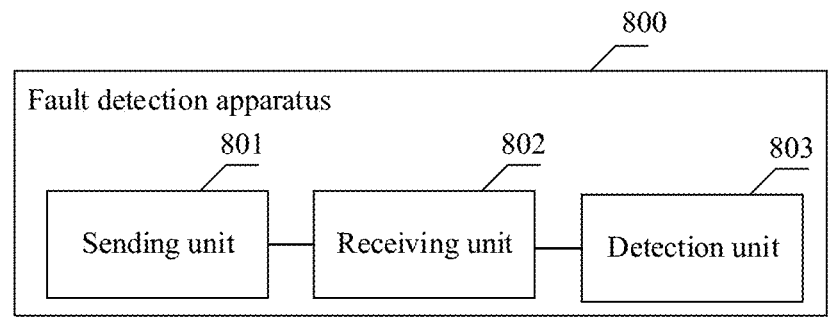
FIG. 8 is a schematic diagram of a structure of a fault detection apparatus 800 according to an embodiment of this application.

In addition, an embodiment of this application further provides a fault detection apparatus 800. As shown in FIG. 8, the apparatus 800 is used in a second network device, for example, may perform a function of the PE device 11 in the embodiment shown in FIG. 1. The apparatus 800 may include a sending unit 801, a receiving unit 802, and a detection unit 803.

The sending unit 801 is configured to send a BFD packet to a first network device through a first forwarding path in a first SR policy. The BFD packet includes indication information of a first SID list. The indication information of the first SID list indicates the first network device to determine a second forwarding path through which a response packet of the BFD packet is sent, and the second forwarding path and the first forwarding path are reversely co-routed.

When the apparatus 800 is used in the PE device 11 shown in FIG. 1, the sending unit 801 sends the BFD packet to the first network device through the first forwarding path in the first SR policy. In an embodiment, refer to S101 in the embodiment in FIG. 3.

The receiving unit 802 is configured to receive the response packet of the BFD packet from the second forwarding path.

When the apparatus 800 is used in the PE device 11 shown in FIG. 1, the receiving unit 802 receives the response packet of the BFD packet from the second forwarding path. In an embodiment, refer to S104 and S105 in the embodiment in FIG. 3.

The detection unit 803 is configured to perform fault detection on the first forwarding path based on the response packet.

When the apparatus 800 is used in the PE device 11 shown in FIG. 1, the detection unit 803 performs fault detection on the first forwarding path based on the response packet. In an embodiment, refer to S106 in the embodiment in FIG. 3.

In an embodiment, the receiving unit 802 is further configured to: before the BFD packet is sent to the first network device through the first forwarding path in the first SR policy, receive the indication information of the first SID list that is sent by the first network device.

In an embodiment, the receiving unit 802 is further configured to: before the BFD packet is sent to the first network device through the first forwarding path in the first SR policy, receive the indication information of the first SID list that is sent by a control management device. In an example, the receiving unit 802 is configured to receive a BGP SR policy packet sent by the control management device. The BGP SR policy packet carries indication information of a SID list by using a sub-TLV field. In an embodiment, the sending unit 801 is further configured to: before the indication information of the first SID list that is sent by the control management device is received, send the indication information of the first SID list to the control management device. The sending unit 801 is configured to send a BGP-LS packet to the control management device. The BGP-LS packet carries the indication information of the first SID list by using the sub-TLV field.

In an embodiment, the apparatus 800 further includes a generation unit, and the generation unit is configured to generate the indication information of the first SID list. In this case, the sending unit 801 is further configured to send the indication information of the SID list to the first network device.

The indication information of the first SID list may be a path segment or a BSID, or the indication information of the first SID list may be the first SID list itself. Similarly, indication information of a second SID list may alternatively be a path segment, a BSID, or the second SID list itself.

For functions and implementations that can be performed by the fault detection apparatus 800, refer to corresponding descriptions of the PE device 11 in the embodiment shown in FIG. 3. Details are not described herein again.

Figure 9:
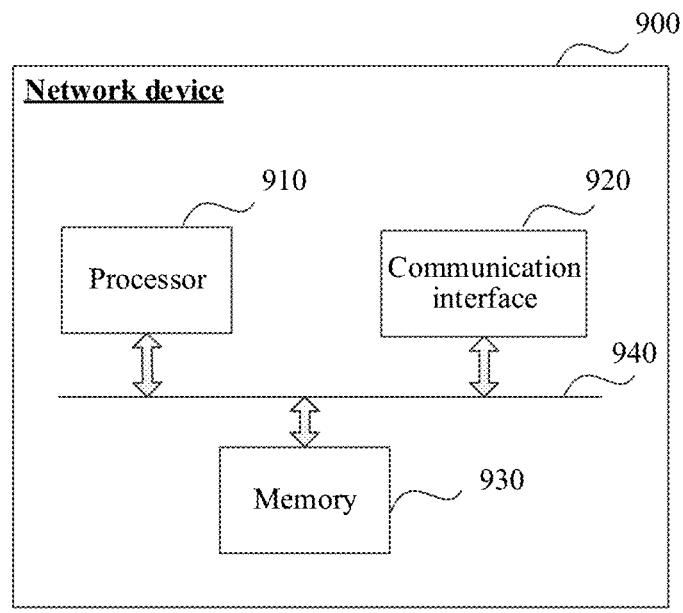
FIG. 9 is a schematic diagram of a structure of a network device 900 according to an embodiment of this application.

FIG. 9 is a schematic diagram of a structure of a network device 900 according to an embodiment of this application. The network device 900 may be, for example, any PE device in the embodiment shown in FIG. 1, or may be a device implementation of the fault detection apparatus in the embodiment shown in FIG. 7 or FIG. 8.

Refer to FIG. 9. The network device 900 includes a processor 910, a communication interface 920, and a memory 930. There may be one or more processors 910 in the network device 900, and FIG. 9 shows one processor as an example. In an embodiment of the application, the processor 910, the communication interface 920, and the memory 930 may be connected by using a bus system or in another manner. In FIG. 9, an example in which a bus system 940 is used for the connection.

The processor 910 may be a CPU, an NP, or a combination of a CPU and an NP. The processor 910 may further include a hardware chip. The hardware chip may be an application-specific integrated circuit (ASIC), a programmable logic device (PLD), or a combination thereof. The PLD may be a complex programmable logic device (CPLD), a field-programmable gate array (field-programmable gate array, FPGA), a generic array logic (GAL), or any combination thereof When the network device 900 includes a first network device, the processor 910 may perform related functions such as determining a second forwarding path based on indication information of a first SID list in the foregoing method embodiment. When the network device 900 is a second network device, the processor 910 may perform related functions such as performing fault detection on a first forwarding path based on a response packet in the foregoing method embodiment.

The communication interface 920 is configured to receive and send a packet. In an embodiment, the communication interface 920 may include a receiving interface and a sending interface. The receiving interface may be configured to receive a packet, and the sending interface may be configured to send the packet. There may be one or more communication interfaces 920. In an embodiment, the communication interface 920 may be configured to implement a function of the sending unit 703 shown in FIG. 7 or a function of the receiving unit 802 shown in FIG. 8.

The memory 930 may include a volatile memory, for example, a random access memory (RAM). The memory 930 may alternatively include a non-volatile memory, for example, a flash memory, a hard disk drive (HDD), or a solid-state drive (SSD). The memory 930 may further include a combination of the foregoing types of memories. For example, the memory 930 may store the indication information of the first SID list mentioned above.

In an embodiment, the memory 930 stores an operating system and a program, an executable module, or a data structure, or a subset thereof, or an extended set thereof. The program may include various operation instructions, for implementing various operations. The operating system may include various system programs, to implement various basic services and process a hardware-based task. The processor 910 may read a program in the memory 930, to implement the fault detection method provided in an embodiment of the application. In an embodiment, the memory 930 may store, for example, program code for implementing a function of the determining unit 702 shown in FIG. 7 or the detection unit 803 shown in FIG. 8.

The memory 930 may be a storage component in the network device 900, or may be a storage apparatus independent of the network device 900.

The bus system 940 may be a peripheral component interconnect (PCI) bus, an extended industry standard architecture (EISA) bus, and the like. The bus system 940 may be classified into an address bus, a data bus, a control bus, and the like. For ease of representation, only one thick line is for representing the bus in FIG. 9, but this does not mean that there is only one bus or only one type of bus.

Figure 10:
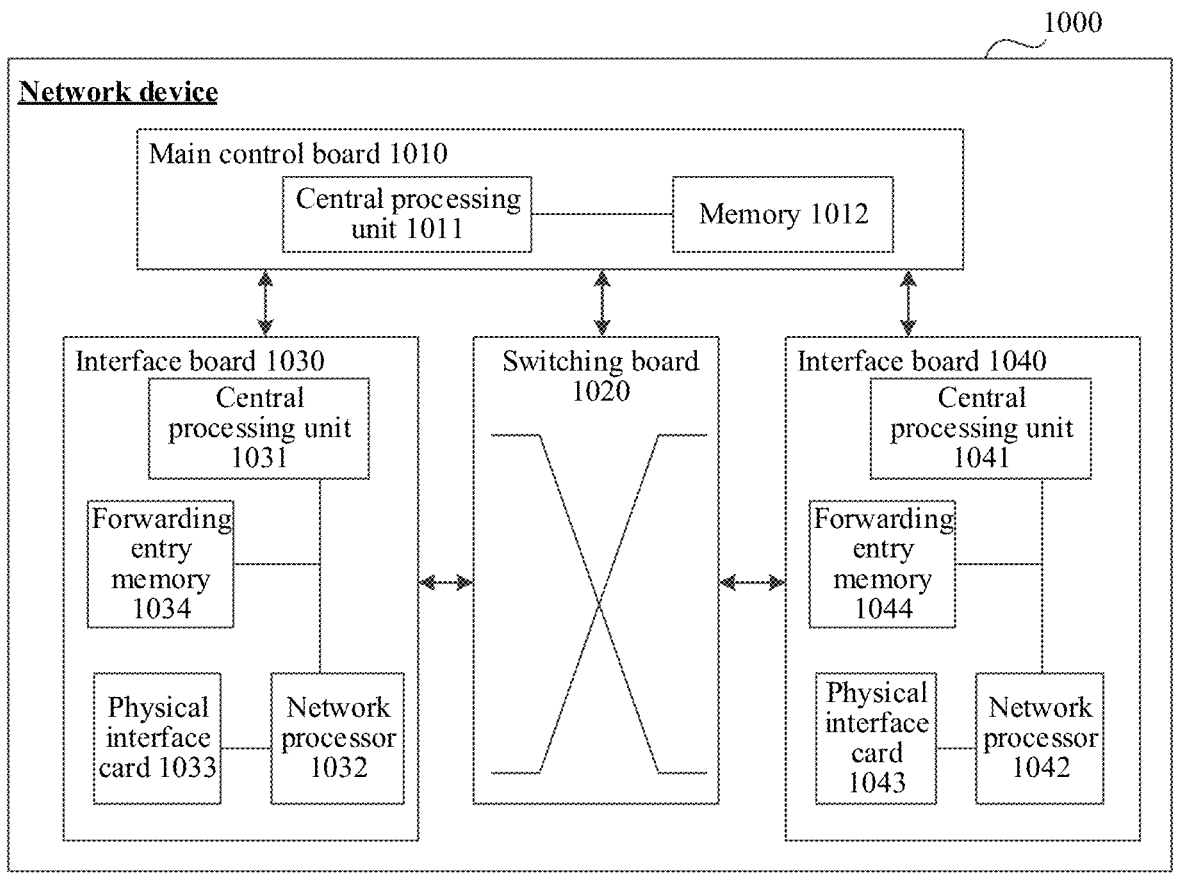
FIG. 10 is a schematic diagram of a structure of a network device 1000 according to an embodiment of this application.

FIG. 10 is another schematic diagram of a structure of a network device 1000 according to an embodiment of this application. The network device 1000 may be configured as any PE device in the embodiment shown in FIG. 1, or may be a device implementation of the fault detection apparatus in the embodiment shown in FIG. 7 or FIG. 8.

The network device 1000 includes a main control board 1010 and an interface board 1030.

The main control board 1010 is also referred to as a main processing unit (MPU) or a route processor card. The main control board 1010 controls and manages components in the network device 1000, including functions such as routing calculation, device management, device maintenance, and protocol processing. The main control board 1010 includes a central processing unit 1011 and a memory 1012.

The interface board 1030 is also referred to as a line processing unit (LPU) card, a line card, or a service board. The interface board 1030 is configured to provide various service interfaces and forward a data packet. The service interface includes but is not limited to an Ethernet interface, a POS (Packet over SONET/SDH) interface, and the like. The Ethernet interface is, for example, a flexible Ethernet service interface (FlexE Clients). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030, and communicate with the central processing unit 1011 on the main control board 1010.

The network processor 1032 is configured to forward a packet. A form of the network processor 832 may be a forwarding chip. In an embodiment, processing on an uplink packet includes processing at a packet ingress interface and forwarding table lookup, and processing on a downlink packet includes forwarding table lookup and the like.

The physical interface card 1033 is configured to implement a physical layer interconnection function. Original traffic enters the interface board 1030 from the physical interface card 1033, and a processed packet is sent out from the physical interface card 1033. The physical interface card 1033 includes at least one physical interface. The physical interface is also referred to as a physical port. The physical interface card 1033, also referred to as a subcard, may be mounted on the interface board 1030, and is responsible for converting an optical/electrical signal into a packet, performing validity check on the packet, and forwarding the packet to the network processor 1032 for processing. In some embodiments, the central processing unit 831 on the interface board 1030 may also perform a function of the network processor 1032, for example, implementing software forwarding based on a general-purpose CPU, so that the network processor 1032 is not required in the physical interface card 1033.

In an embodiment, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

In an embodiment, the network device 1000 further includes a switching board 1020. The switching board 1020 may also be referred to as a switch fabric unit (SFU). When the network device includes a plurality of interface boards 1030, the switching board 1020 is configured to complete data exchange between the interface boards. For example, the interface board 1030 and the interface board 1040 may communicate with each other through the switching board 820.

The main control board 1010 is coupled to the interface board 1030. For example, the main control board 1010, the interface board 1030, the interface board 1040, and the switching board 1020 are connected to a system backboard through a system bus. In this way, interworking is implemented. In an embodiment, an inter-process communication (IPC) channel is established between the main control board 1010 and the interface board 1030, and the main control board 1010 communicates with the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1032 looks up the table, and forwards a packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as a first network device, the central processing unit 1011 may determine a second forwarding path based on indication information of a first SID list. The network processor 1032 may trigger the physical interface card 1033 to send a first response packet of a first BFD packet to a second network device through the second forwarding path.

If the network device 1000 is configured as the second network device, the network processor 1032 may trigger the physical interface card 1033 to send a BFD packet to the first network device through a first forwarding path in a first SR policy, and receive a response packet of the BFD packet through the second forwarding path. The central processing unit 1011 may perform fault detection on the first forwarding path based on the response packet.

It should be understood that the receiving unit 701, the sending unit 703, and the like in the fault detection apparatus 700 may be equivalent to the physical interface card 1033 or the physical interface card 1043 in the network device 1000. The determining unit 702 and the like in the fault detection apparatus 700 may be equivalent to the central processing unit 1011 or the central processing unit 1031 in the network device 1000. The sending unit 801, the receiving unit 802, and the like in the fault detection apparatus 800 may be equivalent to the physical interface card 1033 or the physical interface card 1043 in the network device 1000. The detection unit 803 and the like in the fault detection apparatus 800 may be equivalent to the central processing unit 1011 or the central processing unit 1031 in the network device 1000.

It should be understood that an operation on the interface board 1040 is consistent with an operation on the interface board 1030 in an embodiment of the application. For brevity, details are not described again. It should be understood that the network device 1000 in an embodiment may correspond to any node in the foregoing method embodiments. The main control board 1010, the interface board 1030, and/or the interface board 1040 in the network device 1000 may implement functions and/or operations implemented by any node in the foregoing method embodiments. For brevity, details are not described herein again.

It can be understood that, there may be one or more main control boards. When there are a plurality of main control boards, the main control boards may include a primary main control board and a standby main control board. There may be one or more interface boards. A network device having a stronger data processing capability provides more interface boards. There may alternatively be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. In an embodiment, the network device may alternatively be in a form in which there is only one card. In an embodiment, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. An architecture that is to be used depends on a networking deployment scenario.

In some possible embodiments, each node may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine can be configured as nodes. For example, each node may be implemented based on a general-purpose physical server in combination with a network functions virtualization (NFV) technology. Each node is a virtual host, a virtual router, or a virtual switch. By reading this application, persons skilled in the art may obtain, on the general-purpose physical server through virtualization with reference to the NFV technology, the node having the foregoing functions. Details are not described herein.

It should be understood that the network devices in the foregoing product forms separately have any function of the node in the foregoing method embodiments. Details are not described herein.

Figure 11:
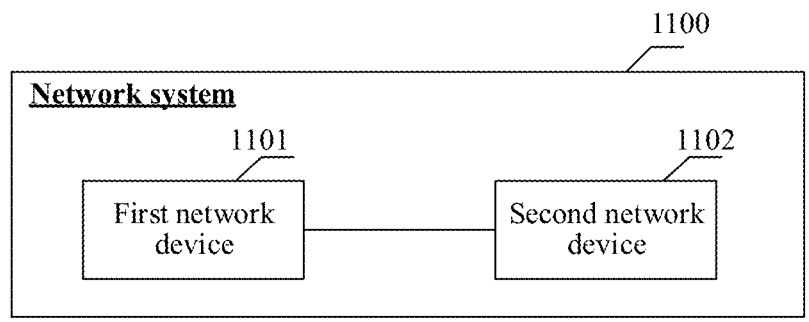
FIG. 11 is a schematic diagram of a structure of a network system 1100 according to an embodiment of this application.

An embodiment of this application further provides a network system 1100, as shown in FIG. 11. The network system 1100 may include a first network device 1101 and a second network device 1102. The first network device 1101 may be the PE device 12 shown in FIG. 1, the fault detection apparatus 700 shown in FIG. 7, the network device 900 configured as a first network device shown in FIG. 9, or the network device 1000 configured as a first network device shown in FIG. 10. The second network device 1102 may be the PE device 11 shown in FIG. 1, the fault detection apparatus 800 shown in FIG. 8, the network device 900 configured as a second network device shown in FIG. 9, or the network device 1000 configured as a second network device shown in FIG. 10.

An embodiment of this application further provides a chip. The chip includes a processor and an interface circuit. The interface circuit is configured to receive instructions and transmit the instructions to the processor. For example, the processor may be a implementation form of the fault detection apparatus 700 shown in FIG. 7, and may be configured to perform the foregoing method. For another example, the processor may be a implementation form of the fault detection apparatus 800 shown in FIG. 8, and may be configured to perform the foregoing method. The processor is coupled to a memory. The memory is configured to store a program or instructions. When the program or the instructions are executed by the processor, the chip system is enabled to implement the method in any one of the foregoing method embodiments.

In an embodiment, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

In an embodiment, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated circuit (ASIC), a system on a chip (SoC), a central processing unit (CPU), a network processor (NP), a digital signal processing circuit (DSP), a microcontroller unit (microcontroller unit, MCU), a programmable controller (PLD), or another integrated chip.

An embodiment of this application further provides a computer-readable storage medium, including instructions or a computer program. When the instructions or the computer program are/is run on a computer, the computer is enabled to perform the fault detection method provided in the foregoing embodiment.

An embodiment of this application further provides a computer program product including instructions or a computer program. When the instructions or the computer program are/is run on a computer, the computer is enabled to perform the fault detection method provided in the foregoing embodiment.

In the specification, claims, and accompanying drawings of this application, the terms "first", "second", "third", "fourth", and so on (if existent) are intended to distinguish between similar objects but do not necessarily indicate an order or sequence. It should be understood that the data used in such a way are interchangeable in proper circumstances so that embodiments of the present application described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. A part or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or a part of the technical solutions may be implemented in a form of a software product. The computer software product is stored in a storage medium and includes several instructions for enabling a computer device (which may be a personal computer, a server, a network device, or the like) to perform all or a part of the operations of the methods in embodiments of this application. The foregoing storage medium includes any medium that can store program code, such as a USB flash drive, a removable hard disk drive, a read-only memory (ROM), a random access memory (RAM), a magnetic disk, or an optical disc.

Persons skilled in the art can be aware that, in the foregoing one or more examples, services described in the present application may be implemented by using hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or a dedicated computer.

The objectives, technical solutions, and beneficial effects of the present application have been further described in detail in the foregoing implementations. It can be understood that the foregoing descriptions are merely implementations of the present application.

The foregoing embodiments are merely intended for describing the technical solutions of this application, but not for limiting this application. Although this application is described in detail with reference to the foregoing embodiments, persons of ordinary skill in the art can understand that they may still make modifications to the technical solutions described in the foregoing embodiments, or make equivalent replacements to a part of technical features thereof The modifications and replacements do not make the essence of the corresponding technical solutions depart from the scope of the technical solutions of embodiments of this application.

What is claimed is:

1. A fault detection method, comprising:
receiving, by a first network device through a first forwarding path in a first segment routing policy (SR policy), a first bidirectional forwarding detection (BFD) packet sent by a second network device, wherein the first BFD packet comprises indication information of a first segment identifier list (SID list);
determining, by the first network device, a second forwarding path based on the indication information of the first SID list, wherein the second forwarding path and the first forwarding path are reversely co-routed; and
sending, by the first network device, a first response packet of the first BFD packet to the second network device through the second forwarding path, wherein the first response packet indicates the second network device to perform fault detection on the first forwarding path.

2. The method according to claim 1, wherein before the receiving the first BFD packet sent by the second network device, the method further comprises:
generating, by the first network device, the indication information of the first SID list; or
receiving, by the first network device, the indication information of the first SID list sent by the second network device.

3. The method according to claim 1, further comprising:
receiving, by the first network device, a message sent by a control management device, wherein the message comprises the indication information of the first SID list.

4. The method according to claim 3, wherein the message further comprises indication information of a second SID list, wherein the indication information of the second SID list indicates the first forwarding path, and the indication information of the first SID list indicates the second forwarding path; or the indication information of the second SID list indicates the second forwarding path, and the indication information of the first SID list indicates the first forwarding path.

5. The method according to claim 3, wherein the message is a border gateway protocol segment routing policy (BGP SR policy) packet that carries the indication information of the first SID list by using a sub type length value (sub-TLV) field.

6. The method according to claim 1, wherein the indication information of the first SID list indicates a SID list corresponding to the second forwarding path.

7. The method according to claim 1, wherein the indication information of the first SID list indicates a SID list corresponding to the first forwarding path, and the determining the second forwarding path based on the indication information of the first SID list comprises:
determining, by the first network device, the indication information of the second SID list based on the indication information of the first SID list; and
determining, by the first network device, the second forwarding path based on the indication information of the second SID list.

8. The method according to claim 1, further comprising:
sending, by the first network device, a second BFD packet to the second network device through the second forwarding path in a second SR policy, wherein the second BFD packet comprises indication information of a third SID list, and the indication information of the third SID list indicates the first network device to determine the first forwarding path through which a second response packet of the second BFD packet is sent;
receiving, by the first network device, the second response packet from the first forwarding path; and
performing, by the first network device, fault detection on the second forwarding path based on the second response packet.

9. The method according to claim 1, further comprising:
receiving, by the first network device through a third forwarding path in the first SR policy, a third BFD packet sent by the second network device, wherein the third BFD packet comprises indication information of a fourth SID list, and the third forwarding path is different from the first forwarding path;
determining, by the first network device, a fourth forwarding path based on the indication information of the fourth SID list, wherein the fourth forwarding path and the third forwarding path are reversely co-routed; and
sending, by the first network device, a third response packet of the third BFD packet to the second network device through the fourth forwarding path, wherein the third response packet indicates the second network device to perform fault detection on the third forwarding path.

10. A fault detection method, comprising:
sending, by a second network device, a bidirectional forwarding detection (BFD) packet to a first network device through a first forwarding path in a first segment routing policy (SR policy), wherein the BFD packet comprises indication information of a first segment identifier list (SID list), the indication information of the first SID list indicates the first network device to determine a second forwarding path through which a response packet of the BFD packet is sent, and the second forwarding path and the first forwarding path are reversely co-routed;
receiving, by the second network device, the response packet of the BFD packet from the second forwarding path; and
performing, by the second network device, fault detection on the first forwarding path based on the response packet.

11. The method according to claim 10, wherein before the sending the BFD packet to the first network device through the first forwarding path in the first SR policy, the method further comprises:
   receiving, by the second network device, the indication information of the first SID list sent by the first network device; or
   receiving, by the second network device, the indication information of the first SID list sent by a control management device.

12. The method according to claim 10, further comprising:
   generating, by the second network device, the indication information of the first SID list.

13. The method according to claim 12, further comprising:
   sending, by the second network device, the indication information of the first SID list to a control management device.

14. The method according to claim 13, wherein the sending the indication information of the first SID list to the control management device comprises:
   sending, by the second network device, a border gateway protocol-link state (BGP-LS) packet to the control management device, wherein the BGP-LS packet carries the indication information of the first SID list by using a sub type length value (sub-TLV) field.

15. The method according to claim 1, wherein the indication information of the first SID list is a path segment or a binding segment identifier (BSID).

16. A first network device, comprising:
   a processor; and
   a memory coupled to the processor to store instructions, which when executed by the processor, cause the first network device to be configured to:
   receive through a first forwarding path in a first segment routing policy (SR policy), a first bidirectional forwarding detection (BFD) packet sent by a second network device, wherein the first BFD packet comprises indication information of a first segment identifier list (SID list);
   determine a second forwarding path based on the indication information of the first SID list, wherein the second forwarding path and the first forwarding path are reversely co-routed; and
   send a first response packet of the first BFD packet to the second network device through the second forwarding path, wherein the first response packet indicates the second network device to perform fault detection on the first forwarding path.

17. The first network device according to claim 16, wherein the instructions, when executed by the processor, further cause the first network device to be configured to:
   generate the indication information of the first SID list; or
   receive the indication information of the first SID list sent by the second network device.

18. The first network device according to claim 16, wherein the instructions, when executed by the processor, further cause the first network device to be configured to:
   receive a message sent by a control management device, wherein the message comprises the indication information of the first SID list.

19. The first network device according to claim 18, wherein the message further comprises indication information of a second SID list, wherein the indication information of the second SID list indicates the first forwarding path, and the indication information of the first SID list indicates the second forwarding path; or the indication information of the second SID list indicates the second forwarding path, and the indication information of the first SID list indicates the first forwarding path.

20. The first network device according to claim 18, wherein the message is a border gateway protocol segment routing policy (BGP SR policy) packet that carries the indication information of the first SID list by using a sub type length value (sub-TLV) field.

21. The first network device according to claim 16, wherein the indication information of the first SID list indicates a SID list corresponding to the first forwarding path, and wherein the first network device is further to be configured to:
   determine the indication information of the second SID list based on the indication information of the first SID list; and
   determine the second forwarding path based on the indication information of the second SID list.

22. The first network device according to claim 16, wherein the instructions, when executed by the processor, further cause the first network device to be configured to:
   send a second BFD packet to the second network device through the second forwarding path in a second SR policy, wherein the second BFD packet comprises indication information of a third SID list, and the indication information of the third SID list indicates the first network device to determine the first forwarding path through which a second response packet of the second BFD packet is sent;
   receive the second response packet from the first forwarding path; and
   perform fault detection on the second forwarding path based on the second response packet.

23. The first network device according to claim 16, wherein the instructions, when executed by the processor, further cause the first network device to be configured to:
   receive through a third forwarding path in the first SR policy, a third BFD packet sent by the second network device, wherein the third BFD packet comprises indication information of a fourth SID list, and the third forwarding path is different from the first forwarding path;
   determine a fourth forwarding path based on the indication information of the fourth SID list, wherein the fourth forwarding path and the third forwarding path are reversely co-routed; and
   send a third response packet of the third BFD packet to the second network device through the fourth forwarding path, wherein the third response packet indicates the second network device to perform fault detection on the third forwarding path.

24. A second network device, comprising:
   a processor; and
   a memory coupled to the processor to store the instructions, which when executed by the processor, cause the second network device to be configured to:
   send a bidirectional forwarding detection (BFD) packet to a first network device through a first forwarding path in a first segment routing policy (SR policy), wherein the BFD packet comprises indication information of a first segment identifier list (SID list), the indication information of the first SID list indicates the first network device to determine a second forwarding path through which a response packet of the BFD packet is sent, and the second forwarding path and the first forwarding path are reversely co-routed;

receive the response packet of the BFD packet from the second forwarding path; and perform fault detection on the first forwarding path based on the response packet.

25. The second network device according to claim 24, wherein the instructions, when executed by the processor, further cause the second network device to be configured to:

receive the indication information of the first SID list sent by the first network device; or receive the indication information of the first SID list sent by a control management device.

26. The second network device according to claim 24, wherein the instructions, when executed by the processor, further cause the second network device to be configured to:

generate the indication information of the first SID list.

27. The second network device according to claim 26, wherein the instructions, when executed by the processor, further cause the second network device to be configured to:

send the indication information of the first SID list to a control management device.

28. The second network device according to claim 27, wherein the instructions, when executed by the processor, further cause the second network device to be configured to:

send a border gateway protocol-link state (BGP-LS) packet to the control management device, wherein the BGP-LS packet carries the indication information of the first SID list by using a sub type length value (sub-TLV) field.

* * * * *